United States Patent
Chen et al.

(10) Patent No.: US 11,426,702 B2
(45) Date of Patent: Aug. 30, 2022

(54) METHOD AND SYSTEM FOR TREATMENT OF SPENT CHLOROALUMINATE IONIC LIQUID CATALYST AND ALKALINE WASTEWATER

(71) Applicant: CHINA UNIVERSITY OF PETROLEUM-BEIJING, Beijing (CN)

(72) Inventors: Chunmao Chen, Beijing (CN); Zhichang Liu, Beijing (CN); Zhongjin Yi, Beijing (CN); Rui Zhang, Beijing (CN); Jiahao Liang, Beijing (CN); Xianghai Meng, Beijing (CN); Haiyan Liu, Beijing (CN); Chunming Xu, Beijing (CN); Qinghong Wang, Beijing (CN)

(73) Assignee: CHINA UNIVERSITY OF PETROLEUM-BEIJING, Beijing (CN)

( * ) Notice: Subject to any disclaimer, the term of this patent is extended or adjusted under 35 U.S.C. 154(b) by 137 days.

(21) Appl. No.: 17/006,723

(22) Filed: Aug. 28, 2020

(65) Prior Publication Data
US 2020/0392029 A1 Dec. 17, 2020

Related U.S. Application Data

(63) Continuation of application No. PCT/CN2018/123215, filed on Dec. 24, 2018.

(30) Foreign Application Priority Data

Mar. 1, 2018 (CN) .......................... 201810172039.X

(51) Int. Cl.
C02F 9/00 (2006.01)
C02F 11/122 (2019.01)
(Continued)

(52) U.S. Cl.
CPC ................. *B01J 19/20* (2013.01); *C02F 9/00* (2013.01); *C02F 11/12* (2013.01); *C02F 11/122* (2013.01);
(Continued)

(58) Field of Classification Search
CPC ......... B01J 31/0298; C02F 11/13; C02F 9/00; C02F 11/12; C02F 11/122; C02F 1/5281;
(Continued)

(56) References Cited

U.S. PATENT DOCUMENTS

| 5,779,997 A | 7/1998 | Nyman et al. |
| 2010/0129921 A1 | 5/2010 | Timken |
| 2013/0211175 A1 | 8/2013 | Timken |

FOREIGN PATENT DOCUMENTS

| AU | 2014262170 A1 | 11/2014 |
| CN | 101423279 A | 5/2009 |

(Continued)

OTHER PUBLICATIONS

International Search Report for PCT/CN2018/123215.
The first OA of CN201880090315.6.

*Primary Examiner* — Claire A Norris
(74) *Attorney, Agent, or Firm* — J.C. Patents

(57) ABSTRACT

A method and a system for treatment of a spent chloroaluminate ionic liquid catalyst and an alkaline wastewater, where the method includes: 1) mixing the catalyst with a concentrated brine for hydrolysis reaction until residual activity of the catalyst is completely eliminated, to obtain an acidic hydrolysate and an acid-soluble oil; 2) mixing the acidic hydrolysate with an alkaline solution containing the alkaline wastewater for neutralization reaction until this reaction system becomes weak alkaline, to obtain a neutralization solution; 3) fully mixing the neutralization solution with a flocculant, carrying out sedimentation and separation, collecting the concentrated brine at an upper layer for reuse (Continued)

in the hydrolysis reaction, and collecting concentrated flocs at a lower layer; 4) dehydrating the concentrated flocs to obtain concentrated brine for reuse into the hydrolysis reaction, and collecting a wet solid slag; and 5) drying the wet solid slag to obtain a dry solid slag.

20 Claims, 8 Drawing Sheets

(51) Int. Cl.

| | | |
|---|---|---|
| *C04B 5/00* | (2006.01) | |
| *C02F 11/16* | (2006.01) | |
| *B01J 19/20* | (2006.01) | |
| *C02F 11/13* | (2019.01) | |
| *C10G 53/04* | (2006.01) | |
| *C02F 11/12* | (2019.01) | |
| *C02F 1/52* | (2006.01) | |
| *C02F 1/56* | (2006.01) | |
| *C02F 1/66* | (2006.01) | |
| *C02F 11/127* | (2019.01) | |
| *C02F 1/00* | (2006.01) | |
| *C02F 103/36* | (2006.01) | |
| *C02F 11/121* | (2019.01) | |

(52) U.S. Cl.
CPC ............... *C02F 11/13* (2019.01); *C04B 5/00* (2013.01); *C10G 53/04* (2013.01); *C02F 1/5281* (2013.01); *C02F 1/56* (2013.01); *C02F 1/66* (2013.01); *C02F 11/121* (2013.01); *C02F 11/127* (2013.01); *C02F 11/16* (2013.01); *C02F 2001/007* (2013.01); *C02F 2103/365* (2013.01); *C10G 2300/1003* (2013.01); *C10G 2300/205* (2013.01); *C10G 2300/701* (2013.01)

(58) Field of Classification Search
CPC ...... C02F 1/56; C02F 1/66; C04B 5/00; C10G 53/04
USPC .......................................... 210/711; 588/318
See application file for complete search history.

(56) References Cited

FOREIGN PATENT DOCUMENTS

| | | |
|---|---|---|
| CN | 103588266 A | 2/2014 |
| CN | 103626351 A | 3/2014 |
| CN | 104174193 A | 12/2014 |
| CN | 104961767 A | 10/2015 |
| CN | 105457973 A | 4/2016 |
| CN | 105714129 A | 6/2016 |
| EP | 0651062 A1 | 5/1995 |

METHOD AND SYSTEM FOR TREATMENT OF SPENT CHLOROALUMINATE IONIC LIQUID CATALYST AND ALKALINE WASTEWATER

CROSS-REFERENCE TO RELATED APPLICATIONS

This application is a continuation of International Application No. PCT/CN2018/123215, filed on Dec. 24, 2018, which claims priority to Chinese Patent Application No. 201810172039.X, filed on Mar. 1, 2018, both of which are hereby incorporated by reference in their entireties.

FIELD

The present disclosure belongs to the technical field of petrochemical industry, and in particular, relates to a method and a system for treatment of a spent chloroaluminate ionic liquid catalyst and an alkaline wastewater.

BACKGROUND

As the national clean oil product upgrading strategy has entered a period of accelerated promotion, as an ideal clean gasoline blending component, the demand for high-octane alkylated oil has ushered in explosive growth. Catalytic alkylation with C4 as a raw material is the main process for producing alkylated oil, and most of the existing alkylation processes use two traditional process routes, hydrofluoric acid method and sulfuric acid method. However, the above-mentioned traditional process routes use hydrofluoric acid and sulfuric acid as catalysts, which causes not only huge safety hazards to the process, equipment and personnel, but also a major environmental hazard due to a large amount of "waste acid slag" and alkali-containing wastewater discharged from the process. Even if the "waste acid slag" is regenerated with high input, contents of $SO_2$, $NO_x$ and acid mist in the flue gas cannot meet environmental protection standards. Therefore, the production of alkylated oil urgently needs an advanced process that is safer and more environmentally friendly.

Using ionic liquid as a catalyst for the alkylation reaction is far superior to the traditional hydrofluoric acid method and sulfuric acid method in terms of product conversion efficiency, process safety and environmental friendliness. Compared with the hydrofluoric acid method and the sulfuric acid method, the chloroaluminate ionic liquid alkylation process has a relatively strong overall competitiveness, and has been adopted by newly-built alkylate oil production devices. However, the chloroaluminate ionic liquid alkylation process still produces a small amount of waste catalyst and alkaline wastewater (that is, alkali washing wastewater), where the waste catalyst by-product per ton of alkylated oil is about 3 kg, and the alkali washing wastewater by-product per ton of alkylated oil is 20-30 kg, outputs of the two are 5% and 3% of the sulfuric acid method. The waste catalyst produced by the chloroaluminate ionic liquid alkylation process has basically the same components as fresh catalyst, except for slightly reduced activity and inclusion of acid-soluble hydrocarbons, and thus has characteristics of high activity, high acidity and high oil content, and it is extremely necessary to carry out harmless and resourcelization disposal of the waste catalyst.

The invention patent with publication number CN105457973A discloses a method and system for treatment of spent catalyst of a chloroaluminate ionic liquid, it includes first conducting a digestion-neutralization reaction between the spent catalyst and the alkali solution to eliminate the activity and acidity of the spent catalyst, and then recovering the metal and oil resources in the spent catalyst. The above method and system can harmlessly process the spent catalyst of chloroaluminate ionic liquid to a certain extent and realize resourcelization of metal and acid-soluble oil in the spent catalyst. However, the inventor found through a large amount of research that the above method and system still have the following defects: 1) when alkali is directly added to a digestion reactor to digest and neutralize the spent catalyst, the reaction process is very intense, and the stability and safety of the process and system are relatively poor; 2) the acid-soluble oil in the spent catalyst is likely to be carbonized during the digestion-neutralization reaction, the recovery rate of the acid-soluble oil is less than 70%, in addition, the recovered acid-soluble oil has a high water content (water content is about 7 wt %) and has particulate carbon impurities (the content of the particulate carbon impurities is about 5 wt %), and the quality of the oil is poor; 3) the spent catalyst is digested and neutralized to obtain a three-phase mixture composed of water phase/acid-soluble oil phase/floc, and when recovering the acid-soluble oil, the emulsified oil needs to be demulsified and recovered, which is not conducive to subsequent treatment; and 4) twice flocculation and twice dehydration method is used to recover the metal and the acid-soluble oil in the spent catalyst, the process is relatively complicated and has a high operation cost.

In addition, in the process of alkylation of the chloroaluminate ionic liquid, alkali washing of alkylated oil products is an important measure for ensuring the quality of oil, and the discharged alkali washing wastewater usually contains sodium hydroxide, sodium meta-aluminate, sodium chloride and a small amount of petroleum pollutants. At present, the alkali washing wastewater is usually discharged to the sewage treatment system for processing, which not only needs to add a large amount of extraneous acid to neutralize it, but also adds a large amount of materialization sludge containing aluminum hydroxide after neutralization, and the salt load and organic load of the neutralized wastewater are relatively high, which poses a serious impact on the stable operation of the sewage treatment system.

Since the alkylation of chloroaluminate ionic liquids is a new process in the petrochemical industry, the treatment of two new types of pollution sources, spent catalysts and alkali washing wastewater, is still under continuous exploration. Therefore, how to treat and utilize the two types of pollution sources of chloroaluminate ionic liquid, the spent catalysts and the alkali washing wastewater, in a harmless and resourcelization manner to realize a green upgrade of alkylation process of the chloroaluminate ionic liquid, is a major issue in the field of the petrochemical industry.

SUMMARY

The present disclosure provides a method and system for treatment of a spent chloroaluminate ionic liquid catalyst and an alkaline wastewater, the method and system can overcome the above-mentioned defects in the prior art, and can not only gently eliminate the activity of the spent catalyst, but also improve the stability and safety of the process operation, in addition, the acid-soluble oil in the spent catalyst is not easy to be carbonized, the recovery rate of the acid-soluble oil is high, the content of water and impurities in the recovered acid-soluble oil is low, and the oil quality is high.

The present disclosure provides a method for treatment of a spent chloroaluminate ionic liquid catalyst and an alkaline wastewater, including the following steps:

1) mixing the spent chloroaluminate ionic liquid catalyst with a concentrated brine for hydrolysis reaction until a residual activity of the spent chloroaluminate ionic liquid catalyst is completely eliminated, and separating products of the hydrolysis reaction to obtain an acidic hydrolysate and an acid-soluble oil respectively;

2) mixing the acidic hydrolysate with an alkaline solution containing the alkaline wastewater for neutralization reaction until this reaction system becomes weak alkaline, to obtain a concentrated brine and a neutralization solution containing metal hydroxide flocs; 3) fully mixing the neutralization solution with a flocculant and implementing sedimentation and separation to obtain the concentrated brine at an upper layer and concentrated flocs at a lower layer, collecting the concentrated brine at the upper layer and reusing it in the hydrolysis reaction, and meanwhile collecting the concentrated flocs at the lower layer;

4) dehydrating the concentrated flocs to separate the concentrated brine from metal hydroxide, collecting the metal hydroxide as a wet solid slag, and reusing the concentrated brine obtained by dehydrating into the hydrolysis reaction; and 5) drying the wet solid slag to obtain a dry solid slag.

There is no strict restriction on the spent chloroaluminate ionic liquid catalyst (spent catalyst for short hereinafter) in the present disclosure, for example, it can be spent catalysts produced by using chloroaluminate ionic liquid to catalyze C4 hydrocarbons to carry out alkylation reactions, by using chloroaluminate ionic liquid to catalyze olefins to carry out polymerizations, by catalytic Friedel-Crafts alkylation reactions or by Friedel-Crafts acylation reactions.

In a specific embodiment of the present disclosure, the spent chloroaluminate ionic liquid catalyst is a spent catalyst produced by using a chloroaluminate ionic liquid to catalyze C4 to produce an alkylated oil; the spent chloroaluminate ionic liquid catalyst has a viscosity up to 600-800 mPa·s, and its active components are mainly aluminum chloride, copper chloride, etc., and other components are mainly acid-soluble hydrocarbons (i.e., acid-soluble oils).

The inventor has discovered through research that the above prior art directly adding alkali to digest and neutralize the spent catalyst will cause the reaction process to be very violent, the reason may be that: the main active component of the spent chloroaluminate ionic liquid catalyst is aluminum chloride, aluminum chloride has relatively high hydrolysis reaction rate, and after contacting with water, it will rapidly hydrolyze to form hydrogen chloride, making the hydrolysate become strongly acidic; at the same time, the hydrolysis reaction is exothermic, increases the hydrolysis reaction rate constant and further increases the hydrolysis reaction rate of aluminum chloride. In particular, when a strong base is directly added during the hydrolysis of aluminum chloride, the neutralization reaction between the strong base and hydrogen chloride will release a large amount of heat, which further increases the rate of the hydrolysis reaction of aluminum chloride; if the heat cannot be dissipated in time, the instantaneous violent heat release will form a local high temperature, which will cause carbonization of acid-soluble oil and generations of oil fume and hydrogen chloride acid mist, in addition, there is a risk of explosion.

Therefore, in the present disclosure, before using the alkaline solution to neutralize the spent catalyst, the spent chloroaluminate ionic liquid catalyst is first mixed with the concentrated brine for the hydrolysis reaction; the study found that a large amount of concentrated brine can quickly disperse the heat generated by the hydrolysis reaction during the hydrolysis of the spent catalyst, thereby interrupting the self-accelerating mechanism of the hydrolysis reaction; at the same time, high concentration of chloride ions in the concentrated brine increases the concentration of the hydrolysis product, has a certain inhibitory effect on the hydrolysis reaction. The above method can not only gently eliminate the activity of the spent catalyst, but also eliminate the promotion effect of the neutralization reaction heat on the hydrolysis reaction rate, and make the process operation more stable and safe; in view of the above, the present disclosure is completed.

In step 1) of the present disclosure, the hydrolysis reaction is mainly used to completely eliminate the residual activity of the waste chloroaluminate ionic liquid catalyst; specifically, when the residual activity is completely eliminated, the acid-soluble oil is separated as far as possible, and a pH value of the acidic hydrolysate is generally stabilized at 2.5-2.8, which is an end point of the hydrolysis reaction.

In particular, in step 1), a content of sodium chloride in the concentrated brine can be 15-22 wt %; in addition, a feed volume ratio of the spent chloroaluminate ionic liquid catalyst to the concentrated brine can be 1: (50-60).

The study found that: the larger the feed volume ratio of the concentrated brine to the spent catalyst, the milder the hydrolysis reaction of the spent catalyst; when the feed volume ratio of the concentrated brine to the spent catalyst is less than 50:1, the hydrolysis reaction system has a significant temperature rise, and hydrogen chloride acid mist escapes; when the feed volume ratio of the concentrated brine to the spent catalyst is less than 10:1, carbonization of acid-soluble oil begins to occur and oily smoke is generated. In view of the fact that when the feed volume ratio of the concentrated brine to the spent catalyst is too large, the required reactor volume is too large, the feed volume ratio of the spent chloroaluminate ionic liquid catalyst and the concentrated brine can be set to 1: (50-60).

In addition, the higher the mass content of sodium chloride in the concentrated brine, the milder the hydrolysis reaction of the spent catalyst; however, when the content of sodium chloride in the concentrated brine is higher than 22 wt %, the concentration of chloride ions in the hydrolysate will be too high, resulting in crystallization and precipitation of sodium chloride; when the content of sodium chloride in the concentrated brine is less than 15 wt %, the hydrolysis reaction system has a significant temperature rise. Therefore, the content of sodium chloride in the concentrated brine can be set to 15-22 wt %.

Under the above conditions, the temperature rise of the entire hydrolysis reaction system is not obvious, and there is no carbonization of acid-soluble oil and obvious escape of acid mist, the hydrolysis reaction is relatively mild.

Further, the inventor has discovered through research that the prior art adopting a complete-mixing flow reactor for the digestion-neutralization reaction will lead to the carbonization of the acid-soluble oil, resulting in a lower recovery rate, the reason may be that: the spent catalyst has a relatively high viscosity, and appears in the form of droplets in the concentrated brine, and during the hydrolysis reaction of the spent catalyst, the mass transfer between the active components and moisture is a control factor; due to coating of active components by acid-soluble hydrocarbons in the spent catalyst, the mass transfer between the active components and moisture is weakened, which is beneficial to a gentle progress of the hydrolysis reaction. However, if the spent catalyst droplets are in contact with water in a complete-mixing flow state, the separation of acid-soluble hydrocarbons and active components will be accelerated, the mass transfer between the active components and water body will be enhanced, and the hydrolysis reaction rate will be increased, the hydrolysis reaction process will be more violent; at the same time, the acid-soluble oil generated will also be entrapped into the reaction system, which can easily cause carbonization and also reduces the recovery rate of the acid-soluble oil. Therefore, it is advantageous to make materials contact and react gently during the hydrolysis reaction stage, and to minimize material back-mixing.

Embodiments of the present disclosure are to carry out the above-mentioned hydrolysis reaction in a plug flow packed bed reactor, so as to make the hydrolysis reaction more gentle (that is, to realize gentle hydrolysis); at this time, the spent catalyst is in contact with the concentrated brine in a plug flow state, the degree of material back-mixing is low, the disturbance to the spent catalyst droplets is small, and the mass transfer between the active components and the moisture is weakened, which not only reduces the intensity of the hydrolysis reaction, but also facilitates the separation and recovery of the acid-soluble oil.

In view of the fact that the density of spent catalyst is about 1.36 kg/L, densities of the acidic hydrolysate and the concentrated brine generally do not exceed 1.2 kg/L; at this time, the spent catalyst droplets have a relatively fast sedimentation rate in the concentrated brine, which is not conducive to completing hydrolysis of the spent catalyst. Therefore, the present disclosure is to fill structured packing in the plug flow packed bed reactor, this method comprehensively utilizes high viscosity characteristic of the spent catalyst, boundary layer characteristic on the surface of the packing, and interception of the packing on the catalyst; due to high viscosity and small amount of feed, the spent catalyst flows in a film-like laminar flow on the surface of the structured packing and forms a thicker laminar boundary layer, a larger viscous force enables the sedimentation rate of the spent catalyst to be effectively controlled. In addition, due to existence of the laminar flow bottom layer in the boundary layer, the mass transfer resistance between materials increases, so the mass transfer efficiency between the spent catalyst and the concentrated brine is also effectively controlled. Compared with random packing, material circulation channels of the structured packing are uniform, and channeling is not easy to occur.

In particular, use of high-flux structured packing can provide a smooth flow path for the concentrated brine, and basically maintain a laminar flow state, whiling weaken the mass transfer with the spent catalyst. During the hydrolysis reaction, the spent catalyst is evenly distributed in pores of the structured packing, forming a large number of microelement reaction environments, and contact time between a large amount of the concentrated brine and the spent catalyst is long, thereby ensuring complete hydrolysis of the spent catalyst.

The study found that: porosity and specific surface area of the structured packing have a great impact on the hydrolysis reaction; when the porosity is too low or the specific surface area is too large, there is a risk of the acid-soluble oil and impurities blocking the pores of the packing; when the porosity is too high or the specific surface area is too small, the interception on the spent catalyst is weakened, and there is a risk of incomplete hydrolysis reaction. When the porosity of the structured packing is between 0.95-0.97 $m^3/m^3$ (that is, the pore volume of the structured packing per $m^3$ is 0.95-0.97 $m^3$) and the specific surface area is between 300-500 $m^2/m^3$ (that is, the specific surface area of the structured packing per $m^3$ is 300-500 $m^2$), the rate of the hydrolysis reaction is well controlled, it is not easy to cause blockage of the pores, and the hydrolysis reaction is easy to proceed completely.

Further, the structured packing may be an oleophobic packing and may have an inclined plate structure; the structured packing can also promote coarsening of the acid-soluble oil droplets, making it easier for large-particle oil droplets to float, thereby facilitating the recovery of the acid-soluble oil There is no strict restriction on specific structure and material of the structured packing; for example, the structured packing can be, for example, a Y-shaped corrugated orifice structured packing, etc., and an inclination angle between the corrugation and axis can be about 45°, so that the interception effect on the spent catalyst droplets is good. In addition, the material of the structured packing can be polyethylene (PE), polyvinyl chloride (PVC) or polyvinylidene fluoride (PVDF), which are oleophobic and resistant to acid and chlorine corrosions, are conducive to coarsening of the acid-soluble oil, thereby facilitating recovery of the acid-soluble oil.

Further, when the above-mentioned plug flow packed bed reactor is used to carry out the hydrolysis reaction, airspeed may be 0.25-0.5 $h^{-1}$. Where when the airspeed is 0.5 $h^{-1}$, it is conducive to completing hydrolysis of the spent catalyst, and the pH value can be stabilized at 2.5-2.8; and when the airspeed is 0.25 $h^{-1}$, the acidic hydrolysate has the lowest oil content, and the acid-soluble oil recovered can reach the maximum.

After the mild hydrolysis reaction between the spent catalyst and the concentrated brine is completed, the active components such as aluminum chloride in the spent catalyst are completely deactivated and finally enter the acidic hydrolysate; the acid-soluble oil in the spent catalyst can be recovered and reused by conventional methods such as sedimentation. The acidic hydrolysate formed by the hydrolysis reaction has a high sodium chloride content, strong acidity and contains metal resources, and can be subsequently neutralized to achieve harmlessness and resourcelization.

In step 2) of the present disclosure, the alkaline wastewater can be used to neutralize the acidic hydrolysate formed by the hydrolysis reaction; there is no strict restriction on the alkaline wastewater in the present disclosure, for example, it can be alkali washing wastewater produced when using a chloroaluminate ionic liquid to catalyze C4 to produce an alkylated oil, where sodium hydroxide content is about 10-15 wt %. The above method realizes the simultaneous joint treatment of the spent catalysts and the alkaline wastewater by "using waste to treat waste", which not only reduces addition amounts of external acid and alkali, but also avoids an impact of alkali washing wastewater on a sewage treatment system.

The weak alkaline neutralization solution after the acidic hydrolysate is neutralized by the alkaline solution is mainly composed of the metal hydroxide flocs and the concentrated brine, controlling to be weak alkalinity facilitates the formation of the metal hydroxide flocs as much as possible. For example when the pH is above 7.5, an observation that the formation of the flocs is basically stable, is used as a standard for the completion of the neutralization reaction. In a specific operation, it is detected that the pH value of the neutralization solution is stabilized at 8.0-8.5, which is the end point of the neutralization reaction. During the neutralization reaction, the concentration of the alkaline solution is not strictly limited, and can be adjusted appropriately according to the concentration of sodium chloride in the neutralization solution; when the alkaline wastewater is insufficient to meet the requirements of the neutralization reaction, an extraneous alkaline solution can be supplemented, and at this time, the alkaline wastewater and the extraneous alkaline solution jointly constitute the alkaline solution for neutralizing the acidic hydrolysate.

Specifically, when the concentration of sodium chloride in the neutralization solution is lower than 15 wt %, the concentration of the alkaline solution can be increased; when the concentration of sodium chloride in the neutralization solution is higher than 22 wt %, the concentration of the alkaline solution can be reduced. The preparation concentration of the extraneous alkaline solution is not strictly limited, and the content of sodium hydroxide in the extraneous alkaline solution can be 25-35 wt %.

In the above neutralization reaction process, metal ions such as aluminum and copper in the acidic hydrolysate combine with the hydroxide ions in the alkaline solution to form the metal hydroxide flocs; at the same time, sodium ions in the alkaline solution and chloride ions in the acidic hydrolysate form a high concentration of sodium chloride (i.e., concentrated brine), furthermore, and a small amount of oil carried in the acidic hydrolysate is also transferred to the neutralization solution.

In the present disclosure, the neutralization reaction can be carried out in a complete-mixing flow reactor; the complete-mixing flow reactor can carry out a rapid neutralization reaction, thereby reducing the volume of the reactor. In particular, the airspeed of the complete-mixing flow reactor can be 1-2 $h^{-1}$; among them, when the airspeed of the complete-mixing flow reactor reaches 2 $h^{-1}$, it is conducive to completing neutralization of the acidic hydrolysate, the pH value of the neutralization solution being stabilized at 8.0-8.5, is the end point of the neutralization reaction; when the airspeed increases to 1 $h^{-1}$, the metal hydroxide flocs in the neutralization solution have the highest yield, and the content of the metal hydroxide flocs reaches 2.5-3 wt %.

The neutralization solution formed by the above neutralization reaction is mainly composed of the metal hydroxide flocs and the concentrated brine, and a flocculant is subsequently used for sedimentation and separation, which can preliminarily separate the metal hydroxide flocs and concentrated brine. The collected concentrated brine can be recycled for the hydrolysis reaction of the spent catalyst; the volume of the metal hydroxide flocs is reduced after precipitation and concentration, which reduces a load of the subsequent dehydration treatment.

In step 3) of the present disclosure, adding the flocculant to the neutralization solution can convert loose small particle metal hydroxide flocs into compact large particle flocs (formed by promoting bonding between particles) through adsorption and bridging, which is more conducive to the precipitation of the metal hydroxide flocs. The mixing method of the neutralization solution and the flocculant is not strictly limited, for example, a pipeline mixer can be used for thorough mixing, and then a flocculation precipitation device can be used to settle and separate the flocs from the concentrated brine.

The flocculant used is not strictly limited in present disclosure. For example, an anionic polyacrylamide flocculant can be used, which is more suitable for the flocculation of the metal hydroxide flocs. Specifically, the anionic polyacrylamide flocculant can has a relative molecular weight range of 6-18 million, and further 12-18 million; and a charge density range of 10-40%, and further 10-30%. The use of the above-mentioned anionic polyacrylamide flocculant is more beneficial to promoting mutual adhesion between aluminum hydroxide particles and copper hydroxide particles, thereby facilitating the formation of larger flocs.

The amount of the flocculant used is based on such standard that it can effectively promote the formation and sedimentation of flocs. Further, the study found that: when adding more than 20 g of the above-mentioned flocculant per ton of the neutralization solution, the flocs formed are large and compact, and have good sedimentation performance; when the addition amount of the flocculant per ton of the neutralization solution exceeds 30 g, the sedimentation performance of the flocs is not improved much, and the cost is not economical. Therefore, the addition amount of the flocculant can be set to 20-30 g per ton of the neutralization solution.

In addition, when carrying out sedimentation and separation, generally, an observation that the sedimentation of the flocs no longer significantly increases is used as the completion standard, and it can be observed that when time of the sedimentation and separation reaches about 2 h, there is a clear interface between the concentrated flocs and the concentrated brine, the concentrated brine has almost no entrained flocs, and a concentrated floc layer accounts for about 25% of a volume of the neutralization solution; when time of the sedimentation and separation time is more than 3 h, the sedimentation of the concentrated floc layer is very thorough, accounting for only 20% of the volume of the neutralization solution, and continuing to increase the sedimentation time does not contribute to reducing the volume of the concentrated floc layer. Therefore, the time for sedimentation and separation can be set to 2-3 hours.

After the above sedimentation and separation, the content of the concentrated brine in the formed concentrated flocs can reach about 85-90 wt %, and the solid content of the metal hydroxide is about 10-15 wt %. In addition, a small amount of oil in the neutralization solution will be concentrated in the concentrated brine phase, and thus the concentrated flocs have very low oil content and are cleaner, thereby convenient for subsequent recycling and utilization.

In view of the fact that the concentrated flocs contain a large amount of concentrated brine, which has a relatively large absolute output and it is less economical to use it as a metallurgical raw material or solid waste for carrying away, and at the same time, the concentrated brine is an essential resource for the hydrolysis reaction of the spent catalyst. Therefore, the present disclosure performs dehydration treatment on the concentrated flocs, thereby reducing a total amount of the metal hydroxide system, and meanwhile recycling the concentrated brine for utilization.

In step 4) of the present disclosure, a method of the dehydration treatment of the concentrated flocs is not strictly limited, and conventional mechanical dehydration methods can be used, such as plate and frame filter press or centrifugal dehydration. The metal hydroxide concentrated flocs have large particles, and water contained therein is mainly free water, whether pressure filtration or centrifugal filtration is used, the separation of metal hydroxide solids from the concentrated brine can be achieved. Where when the plate and frame filter press method is used for dehydration, the operating pressure can be about 0.45 MPa; when the centrifugal method is used for dehydration, the separation factor of centrifugal dehydration can be about 3000. The wet solid slag (that is, metal hydroxide concentrated flocs) formed by the above dehydration treatment has a moisture content of about 60-70 wt %; the concentrated brine formed by separation via the dehydration treatment can be reused for the above hydrolysis reaction.

Furthermore, since the moisture in the wet solid slag formed by the dehydration treatment is mainly capillary water, it is difficult to continue to reduce its moisture content and solid slag output regardless of the plate and frame filter press method or the centrifugal dehydration method. Therefore, in step 5) of the present disclosure, a thin-layer drying or a low-temperature dehumidification drying can be used to dry the wet solid slag, so that the capillary water in the wet solid slag can be removed with lower energy consumption.

The thin-layer drying technology, which couples a conduction principle and a radiation drying principle, generally uses thermal fluid indirect heating, which may quickly vaporize the moisture in the wet solid slag; the low-temperature dehumidification drying technology, which is based on a principle of convection drying, generally uses electric direct heating, and although it has a slower speed of dehumidification than that of the thin-layer drying, the equipment investment is low and the process operation is simple. When there is a residual heat medium that can be used, the thin-layer drying technology is preferred. In addition, regardless of the use of the thin-layer drying or the low-temperature dehumidification drying, energy consumption can be reduced by recovering latent heat of water vapors; the condensed water produced in the heat recovery stage is less polluted and can be reused for the preparation of the alkaline solution and the flocculant solution. The moisture content of the dry solid slag formed by the above drying treatment is 10-20 wt %.

The method for treatment of a spent chloroaluminate ionic liquid catalyst and an alkaline wastewater provided by the present disclosure mainly adopts a main technical route of "gentle hydrolysis—rapid neutralization—flocculation sedimentation—mechanical dehydration—dehumidification and drying", this method is simple to operate, can gently eliminate the activity of the spent catalyst, and meanwhile avoids an impact of the alkaline wastewater on a sewage treatment system, the overall process operation is stable and safe, and the metal and oil resources in the spent catalyst are effectively recovered and utilized, intermediate products are also recycled, and the process cost is relatively low, which are conducive to promoting a green upgrade of the ionic liquid alkylation process.

The present disclosure also provides a system for implementing the above method, including a hydrolysis reactor, a neutralization reactor, a flocculation sedimentation system, a mechanical dehydration device and a drying device;

the hydrolysis reactor is configured to mix a spent chloroaluminate ionic liquid catalyst with a concentrated brine for hydrolysis reaction;

the neutralization reactor is connected to the hydrolysis reactor, and is configured to mix an acidic hydrolysate generated by the hydrolysis reaction with an alkaline solution containing the alkaline wastewater for neutralization reaction;

the flocculation sedimentation system is connected to the neutralization reactor, and is configured to fully mix a neutralization solution generated by the neutralization reaction with a flocculant and carry out sedimentation and separation;

the mechanical dehydration device is connected to the flocculation sedimentation system, and is configured to perform a dehydration treatment on concentrated flocs formed by the sedimentation and separation; and the drying device is connected to the mechanical dehydration device, and is configured to dry a wet solid slag formed by the dehydration treatment.

Further, the hydrolysis reactor is a plug flow packed bed reactor, and the plug flow packed bed reactor is filled with structured packing, the structured packing has a porosity of 0.95-0.97 $m^3/m^3$, and a specific surface area of 300-500 $m^2/m^3$.

There is no strict restrictions on a specific structure of the hydrolysis reactor in the present disclosure, and a hydrolysis reaction device known and commonly used in the art can be used. In a specific embodiment of the present disclosure, the hydrolysis reactor used includes a shell, with an annular oil collecting groove, a water distributor for distributing the concentrated brine and a material distributor for distributing spent chloroaluminate ionic liquid catalyst are sequentially provided at an upper part of the shell from top to bottom; a packing support bracket for supporting the packing is provided at a lower part of the shell; an exhaust port is provided at the top of the shell; an oil outlet, a water inlet and a feed inlet are provided on a side wall of the shell, the oil outlet is in communication with the annular oil collecting groove, the water inlet is in communication with the water distributor, the feed inlet is in communication with the material distributor; and a liquid outlet is provided at the bottom of the shell.

In view of the fact that the spent catalyst has extremely strong acidity, and a viscosity as high as 600-800 mPa·s, and contains a small amount of mechanical impurities, in order to prevent clogging and corrosion, it is preferable to use a mechanical diaphragm pump made of a fluoroplastic material to transport it; in addition, the content of sodium chloride in the concentrated brine is as high as 15-22 wt %, and is highly corrosive, it is preferable to use a stainless steel centrifugal pump to transport it.

In the above-mentioned hydrolysis reactor, the spent catalyst is mixed with concentrated brine to carry out the hydrolysis reaction, acid-soluble hydrocarbons in the spent catalyst are separated from the active components to form acid-soluble oils, which floats to the surface of the liquid, and is collected by the annular oil collecting groove, and then flows into a waste oil storage tank by itself through the oil outlet and its pipeline for refining. In particular, in the above-mentioned hydrolysis reactor, the water inlet and the water distributor are respectively arranged above the feed inlet and the material distributor, which not only facilitates the dispersion of the spent catalyst by the concentrated brine, but also can keep the area where the spent catalyst undergoes hydrolysis reaction away from the acid-soluble oil layer, avoiding the influence of local exothermic heat of hydrolysis on the quality and recovery rate of the acid-soluble oil.

In addition, the active components and the acid-soluble hydrocarbons contained in the spent catalyst will produce volatile organic pollutants (VOCs) and hydrogen chloride during the hydrolysis process, which are concentrated at the top of the hydrolysis reactor, and in order to avoid air pollution, an exhaust port can be set at the top of the hydrolysis reactor, and the gas can be led to a water seal port of a concentrated brine storage tank, the concentrated brine in the concentrated brine storage tank can not only absorb these gaseous pollutants, but also use the liquid level for water sealing; the water sealing can also provide a positive pressure for the hydrolysis reactor and promote reabsorption of these pollutants by the acidic hydrolysate.

In the present disclosure, the structure of the water distributor of the hydrolysis reactor is not strictly limited, as long as it can evenly distribute the concentrated brine in the hydrolysis reactor.

In a specific embodiment of the present disclosure the water distributor includes a water distribution main pipe, and a plurality of parallel water distribution branch pipes arranged at equal intervals are respectively provided on both sides of the water distribution main pipe, a plurality of water distribution holes are distributed at the bottom of each water distribution branch pipe, and a total opening area of the water distribution holes accounts for more than 1% of the cross-sectional area of the hydrolysis reactor. At this time, the water distributor is fishbone type; where spacing between adjacent water distribution branch pipes can be set to more than 5 cm, so as to avoid affecting the floating and pooling of acid-soluble oil; in addition, the arrangement manner of the water distribution holes on the water distribution branch pipes is not strictly limited, and the plurality of water distribution holes can be arranged at equal intervals, and apertures of the plurality of water distribution holes can be set to be the same.

The water distributor with the above structure has a large opening area and a large number of openings, thereby facilitating a uniform distribution of the concentrated brine; in addition, due to low out-of-hole flow rate and low back-mixing of the water distribution holes, a laminar flow is formed in the hydrolysis reactor, which weakens the mass transfer with the spent catalyst, has little disturbance to the acid-soluble oil layer on the hydrolysis liquid surface, and is more conducive to the recovery of the acid-soluble oil.

In the present disclosure, the structure of the material distributor of the hydrolysis reactor is not strictly limited, as long as it can uniformly distribute the spent catalyst in the hydrolysis reactor.

In a specific embodiment of the present disclosure, the material distributor includes a material distribution main pipe, a plurality of semicircular material distribution branch pipes arranged concentrically and at equal intervals are respectively provided on both sides of the material distribution main pipe, a plurality of material distribution holes are distributed at the bottom of each semicircular material distribution branch pipe, and the total opening area of the material distribution holes accounts for more than 2% of the cross-sectional area of the hydrolysis reactor. At this time, the distributor is ring-shaped; where spacing between adjacent distribution branch pipes can be set to more than 5 cm, so as to avoid affecting the floating and pooling of the acid-soluble oil; in addition, the arrangement of the material distribution holes on the distribution branch pipes is not strictly limited, the plurality of distribution holes can be arranged at equal intervals, and the apertures of the plurality of material distribution holes can be set to be the same, and the inner diameter of the material distribution holes, for example, can be set to 3-5 mm.

The material distributor with the above structure has a large opening area and a large number of material distribution holes, thereby facilitating a uniform distribution of the spent catalyst; in addition, due to small inner diameters of the material distribution holes, the spent catalyst is extruded out as small droplets, which is more conducive to its dispersion in the concentrated brine.

In the present disclosure, the neutralization reactor is used to mix the acidic hydrolysate generated by the hydrolysis reaction with the alkaline solution containing the alkaline wastewater for neutralization; a specific structure of the neutralization reactor is not strictly limited, and a conventional neutralization reactor in this field can be used.

In a specific embodiment of the present disclosure, the neutralization reactor is a complete-mixing flow reactor; the neutralization reactor includes a shell. A water distributor for distributing the alkaline solution and a material distributor for distributing the acidic hydrolysate are sequentially provided at an upper part of the shell from top to bottom; a side-entry agitator is provided in the middle of the shell; an exhaust port is provided at the top of the shell; an alkali inlet and a liquid inlet are provided on the side wall of the shell, the alkali inlet is in communication with the water distributor, the liquid inlet is in communication with the material distributor; and a liquid outlet is provided at the bottom of the shell.

The inventor's research shows that arranging the alkali inlet and water distributor of the neutralization reactor above the liquid inlet and the material distributor respectively can enable the position of the metal hydroxide flocs generated by the neutralization reaction to be lower, so that the water distributor is not easily blocked. In particular, the use of the side-entry agitator accelerates the mass transfer and neutralization reaction between the acidic hydrolysate and the alkaline solution, and at the same time prevents premature precipitation of the flocs to block the liquid outlet and its pipeline.

Preferably, a centrifugal pump made of a fluoroplastic material can be used to transport the acidic hydrolysate with high chlorine content; the alkali washing wastewater and the extraneous alkaline solution have high chlorine and alkali contents, and need to be accurately proportioned with the acidic hydrolysate to achieve neutralization, therefore, it is preferable to use a fluoroplastic metering pump to transport the alkali washing wastewater and the extraneous alkaline solution. In addition, since both the acidic hydrolysate and the alkali washing wastewater carry a small amount of oil, the neutralization process will cause an enrichment of VOCs at the top of the neutralization reactor; in order to prevent air pollution, an exhaust port can be set on the top of the neutralization reactor, and a gas can be led to a water seal port of the concentrated brine storage tank, the concentrated brine in the concentrated brine storage tank can not only absorb these gaseous pollutants, but also use the liquid level for water sealing; the water sealing can also provide a positive pressure for the neutralization reactor, thereby promoting the reabsorption of these pollutants by the neutralization solution.

The structures of the water distributor and the material distributor of the neutralization reactor are not strictly limited, as long as they can enable the alkaline solution and the acidic hydrolysate to be evenly distributed in the neutralization reactor, and the same structure as in the hydrolysis reactor can be adopted; at this time, the total opening area of the water distribution holes in the water distributor accounts for more than 1% of the cross-sectional area of the neutralization reactor, and the total opening area of the material distribution holes in the material distributor accounts for more than 2% of the cross-sectional area of the neutralization reactor. The alkali washing wastewater is combined with the extraneous alkaline solution and then is distributed in the neutralization reactor through the fishbone type water distributor, and due to large opening area and large number of openings in the water distributor, the uniform distribution of the alkali washing wastewater and the extraneous alkaline solution in the neutralization reactor is promoted; in addition, the acidic hydrolysate is distributed in the neutralization reactor through the above-mentioned ring-shaped material distributor, the material distributor has a small opening area, and a small number of the material distribution holes and a small inner diameter of the material distribution holes, and local turbulence is formed after the liquid is discharged, which helps the mass transfer and neutralization reaction between the acidic hydrolysate and the alkaline solution.

In the present disclosure, the flocculation sedimentation system is used to fully mix the neutralization solution produced by the neutralization reaction with the flocculant and implement sedimentation and separation; the specific structure of the flocculation sedimentation system is not strictly limited, and conventional structures in the field can be adopted.

In a specific embodiment of the present disclosure, the flocculation sedimentation system includes a pipeline mixer and a flocculation sedimentation device arranged in sequence, the flocculation sedimentation device includes a sealed shell. An annular overflow weir, a central pipe and a material distribution pipe are arranged inside the sealed shell, the material distribution pipe is arranged inside the central pipe, an umbrella-shaped baffle is provided at the bottom of the central pipe; an exhaust port is provided at the top of the sealed shell; a water outlet and a feed inlet are provided on the side wall of the sealed shell, the water outlet is in communication with the annular overflow weir, the feed inlet is in communication with the material distribution pipe; and a slag outlet is provided at the bottom of the sealed shell.

It can be understood that the liquid outlet of the neutralization reactor is connected to an inlet of the pipeline mixer through a pipeline, a reagent inlet is provided on a connecting pipeline between the liquid outlet of the neutralization reactor and the inlet of the pipeline mixer, and a reagent outlet of a flocculant preparation tank is connected with the reagent inlet through a stainless steel metering pump and pipeline. In the present disclosure, the pipeline mixer is convenient to achieve sufficient contact between the neutralization solution and the flocculant; in addition, the stainless steel metering pump is used for feeding, which is convenient for accurately proportioning the flocculant and the neutralization solution to achieve the best flocculation effect.

In the present disclosure, the flocculation sedimentation device with the above-mentioned structure is in the form of a sealed vertical flow sedimentation tank; the neutralization solution containing flocs and the flocculant are fully mixed through the pipeline mixer and then flow into the flocculation sedimentation device by themselves for sedimentation and separation, the moisture content of the concentrated flocs is reduced, which reduces the subsequent processing load of the mechanical dehydration device, and at the same time, the concentrated brine precipitated can be reused in the hydrolysis reactor. Since gaseous pollutants may be escaped from materials in the flocculation sedimentation device, a sealed form is adopted, and at the same time, an exhaust port is set on the top of the flocculation sedimentation device to guide the gas to the concentrated brine storage tank for water sealing. In particular, based on maturity of a separation equipment and ease of operation, the flocculation sedimentation device in the form of the vertical flow sedimentation tank is used to separate the concentrated brine and the flocs; the neutralization solution is mixed with the flocculant and then enters the flocculation sedimentation device through the feed inlet, the neutralization solution is injected by the material distribution pipe down into the central pipe, and baffled through the umbrella-shaped baffle, and the metal hydroxide flocs precipitate and concentrate to the bottom of the flocculation sedimentation device; at the same time, the concentrated brine is lifted to the top of the flocculation sedimentation device, and flows into the concentrated brine storage tank by itself through the annular overflow weir and the water outlet. When a certain precipitation time is reached, an interface between the concentrated flocs and the concentrated brine becomes clear, and the concentrated brine has almost no entrainment of flocs.

Using the mechanical dehydration device to dehydrate the concentrated flocs can significantly reduce the amount of solid slags. Considering that the concentrated flocs have a solid content of about 2-3 wt % and contain the concentrated brine, a screw pump made of stainless steel can be used for transportation. In addition, the moisture in the concentrated flocs is mainly free water, so a conventional plate and frame filter press or a centrifugal dehydrator can be used to obtain a good dehydration effect. In view of the shortcomings of the plate and frame filter press, such as large area, long processing time, and incapable of continuous operation, the mechanical dehydration device is preferably a centrifugal dehydrator, whose separation factor can be about 3000, and at this time, the concentrated flocs can be prepared into a wet solid slag with a moisture content of 60-70%.

Since drying the wet solid slag can continue to reduce the solid slag output and is more conducive to reuse, the system of the present disclosure is provided with a drying device to dry the wet solid slag formed by the mechanical dehydration device. In the present disclosure, a screw conveyor can be used to convey the wet solid slag; this conveying method is relatively clean and avoids the phenomenon of slag drop in a belt transmission.

Further, the drying device may adopt a thin-layer dryer or a low-temperature dehumidification dryer, which can dry the wet solid slag into a dry solid slag with a moisture content of 10-20%. Since the moisture in the dry solid slag is mainly crystal water, continuing to reduce the moisture content is not only inefficient but also uneconomical.

In addition, the moisture in the wet solid slag will be converted into water vapor during the dehumidifying and drying process, and recovering the latent heat of water vapor and reusing the latent heat in the drying process is more beneficial to reducing energy consumption. Therefore, the system of the present disclosure may also include a heat recovery device (that is, a condensed water storage tank), which is used to recover the condensed water generated by the above-mentioned drying device; due to a low pollution load, the recovered condensed water can be reused for the preparation of the extraneous alkaline solution and the flocculant.

It is understandable that, in addition to the above-mentioned main parts, the system of the present disclosure can also include other matching parts, such as spent catalyst storage tank, concentrated brine storage tank, alkali washing wastewater storage tank, extraneous alkaline solution preparation tank, flocculant preparation tank, condensed water storage tank, waste oil storage tank, and various pumps and conveyors for conveying materials, etc., all of them can use conventional devices or parts in the field, and can be set in conventional manners.

In the present disclosure, the spent catalyst storage tank includes a tank body, a side-entry agitator is arranged inside the tank body, a feed inlet and a feed outlet are provided at the lower end of the side wall of the tank body, a discharge port is provided at the bottom of the tank body, and a gas inlet is provided at the top of the tank body; where the side-entry agitator is used to homogenize and equalize the spent catalyst from different periods of time, the gas inlet is used to fill the top of the spent catalyst storage tank with nitrogen for protection to avoid the spent catalyst contacting moisture in the air, and to prevent explosion due to hydrolysis.

In the present disclosure, the concentrated brine storage tank includes a tank body and a water seal pipe, a water inlet is provided at an upper end of a side wall of the tank body, a water outlet is provided at a lower end of a side wall of the tank body, a discharge port is provided at the bottom of the tank body, a water seal port is provided on the top of the tank body, and the water seal pipe is connected with the water seal port. Setting a concentrated brine storage tank not only provides a space for the storage of the concentrated brine as an intermediate product, but also provides raw materials for the hydrolysis reaction, being a key node for recycling of the intermediate product in the entire system; at the same time, water sealing can also control escape of gaseous pollutants in the hydrolysis reactor, the neutralization reactor and the flocculation sedimentation device, which avoids air pollution.

In the present disclosure, the alkali washing wastewater storage tank includes a tank body, a side-entry agitator is provided inside the tank body, a water inlet and a water outlet are provided at the lower end of a side wall of the tank body, and a discharge port is provided at the bottom of the tank body; where the side-entry agitator is used to homogenize and equalize the alkali washing wastewater from different periods of time.

In the present disclosure, the condensed water storage tank includes a tank body, a water inlet is provided at the upper end of a side wall of the tank body, a condensed water outlet is provided at the lower end of a side wall of the tank body, and a discharge port is provided at the bottom of the tank body. Setting the condensed water storage tank not only provides a space for the storage of the condensed water as an intermediate product, but also provides a water source for the preparation of the extraneous alkaline solution and the flocculant, being an important node for recycling of intermediate products in the entire system.

Further, the system of the present disclosure includes a mechanical diaphragm pump and a centrifugal pump, the spent catalyst storage tank is connected to the feed inlet of the hydrolysis reactor through the mechanical diaphragm pump, the concentrated brine storage tank is connected to the water inlet of the hydrolysis reactor through the centrifugal pump, and the oil outlet of the hydrolysis reactor is connected to the waste oil storage tank.

Further, the system of the present disclosure includes a centrifugal pump and a metering pump, the liquid outlet of the hydrolysis reactor is connected to the liquid inlet of the neutralization reactor through the centrifugal pump, the alkali washing wastewater storage tank and the extraneous alkaline solution preparation tank each is connected to the alkali inlet of the neutralization reactor through the metering pump, and the liquid outlet of the neutralization reactor is connected to the pipeline mixer.

Further, the system of the present disclosure includes a metering pump, and the condensed water storage tank is respectively connected, by the metering pump, with the water inlet of the extraneous alkaline solution preparation tank and the water inlet of the flocculant preparation tank. The metering pump is used to transport the condensed water, which is convenient for precise control of concentrations of the extraneous alkaline solution and the flocculant.

In particular, the exhaust port of the hydrolysis reactor, the exhaust port of the neutralization reactor, the water outlet and the exhaust port of the flocculation sedimentation system are respectively connected to the water seal port of the concentrated brine storage tank through pipelines.

In addition, the flocculation sedimentation system and the mechanical dehydration device have a concentrated brine outlet, which is connected to the concentrated brine storage tank, so as to facilitate the reuse of the concentrated brine.

The system of the present disclosure is proposed for the characteristics of spent chloroaluminate ionic liquid catalyst and alkali washing wastewater, the system uses a hydrolysis reactor and a neutralization reactor to realize the harmlessness of the spent catalyst and the alkali washing wastewater and the recovery of oil resources, and uses a flocculation sedimentation system, a mechanical dehydration device and a drying device to achieve the reduction and resourcelization of metal solid slag; in addition, the use of concentrated brine storage tank and condensed water storage tank realizes the recycling of intermediate products. The whole system has a gentle running process, safe operation process, has no new pollution sources and has a high recovery rate of resources, especially, the recovered acid-soluble oil has low water and impurities contents and high oil quality.

DESCRIPTION OF REFERENCE SIGNS

Figure 1:
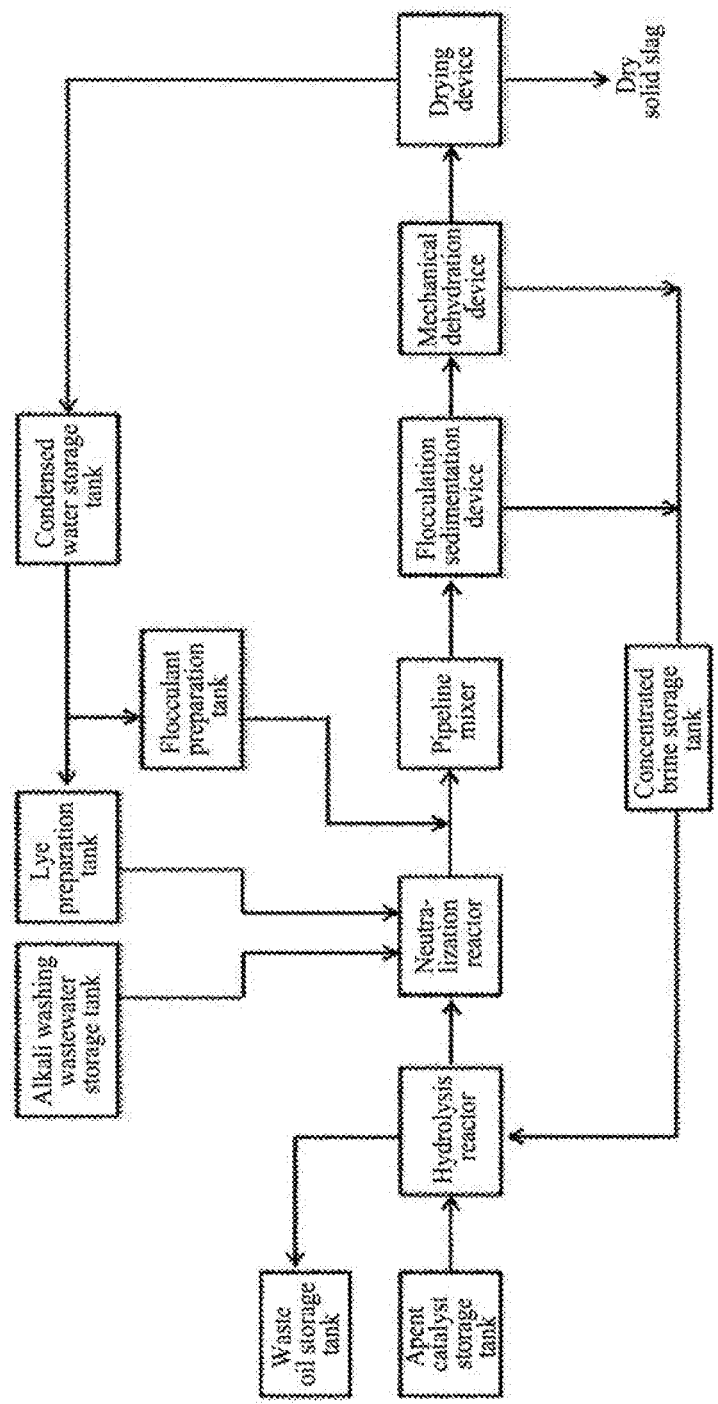
FIG. 1 is a process flow diagram of processing a spent chloroaluminate ionic liquid catalyst and an alkaline wastewater according to an embodiment of the present disclosure.

1: hydrolysis reactor; 11: shell; 12: annular oil collecting groove; 13: water distributor; 14: material distributor; 15: packing support bracket; 16: exhaust port; 17: oil outlet; 18: water inlet; 19: feed inlet; 110: liquid outlet; 111: overflow weir; 112: packing layer;

2: neutralization reactor; 21: shell; 22: water distributor; 23: material distributor; 24: side-entry agitator; 25: exhaust port; 26: alkali inlet; 27: liquid inlet; 28: liquid outlet;

3: flocculation sedimentation device; 31: sealed shell; 32: annular overflow weir; 33: central pipe; 34: material distribution pipe; 35: umbrella-shaped baffle; 36: exhaust port; 37: water outlet; 38: feed inlet; 39: slag outlet;

4: mechanical dehydration device; 5: drying device;

61: spent catalyst storage tank; 611: gas inlet; 62: concentrated brine storage tank; 63: alkali washing wastewater storage tank; 64: extraneous alkaline solution preparation tank; 65: flocculant preparation tank; 66: condensed water storage tank; 67: waste oil storage tank;

71: mechanical diaphragm pump; 72, 77: centrifugal pump; 73, 74, 75, 76: metering pump; 78: screw pump;

8: pipeline mixer; 9: screw conveyor; 10: silo;

101: water distribution main pipe; 102: water distribution branch pipe;

201: material distribution main pipe; 202: material distribution branch pipe; 203: material distribution hole.

DETAILED DESCRIPTION OF THE EMBODIMENTS

In order to make the objectives, technical solution and advantages of the present disclosure clearer, the technical solution of the present disclosure will be described clearly and completely below in conjunction with the embodiments of the present disclosure. It is evident that the described embodiments are only some of the embodiments of the present disclosure, rather than all of the embodiments. All other embodiments obtained by those skilled in the art based on the embodiments of the present disclosure without creative work will also fall within the protection scope of the present disclosure.

The raw materials of embodiments are as follows:

spent chloroaluminate ionic liquid catalyst: is a spent catalyst produced by using a chloroaluminate ionic liquid to catalyze C4 to produce an alkylated oil, the viscosity is about 740 mPa·s, the active components are mainly aluminum chloride and copper chloride, whose total content accounts for about 85 wt %; the other components are acid-soluble hydrocarbons, whose content accounts for about 15 wt %;

alkaline wastewater: is alkali washing wastewater produced by using a chloroaluminate ionic liquid to catalyze C4 to produce an alkylated oil, the concentration of sodium hydroxide is about 12 wt %.

The method for treatment of the above-mentioned spent chloroaluminate ionic liquid catalyst and alkaline wastewater specifically includes: first, mixing the spent chloroaluminate ionic liquid catalyst with concentrated brine for hydrolysis reaction until residual activity of the spent catalyst is completely eliminated, and an acidic hydrolysate and an acid-soluble oil are generated, the acid-soluble oil is separated from the acidic hydrolysate by sedimentation to reach to the upper layer and to be recovered; subsequently, the acidic hydrolysate, the alkali washing wastewater and a prepared extraneous alkaline solution are mixed for neutralization reaction until the system becomes weak alkaline, and a neutralization solution containing metal hydroxide flocs is generated; the neutralization solution and the flocculant are fully mixed and then separated by sedimentation, concentrated flocs are formed at the bottom, and the concentrated brine precipitated from the upper layer is reused for the hydrolysis reaction with the spent catalyst; the above-mentioned concentrated flocs are mechanically dehydrated to produce a wet solid slag with a moisture content of about 60-70 wt %, and the concentrated brine separated from the concentrated flocs is reused for the hydrolysis reaction of the spent catalyst; the wet solid slag is dried to generate dry solid slag with a moisture content of about 10-20 wt %, water vapor generated during the drying process is condensed and then reused for the preparation of the extraneous alkaline solution and flocculant solution.

Embodiment 1

The chloroaluminate compound ionic liquid alkylation device with an output of 300,000 tons/year is taken as an example, the amount of spent catalyst discharged by the device during the production process is 2140 tons/year, and the spent catalyst is collected in a spent catalyst storage tank for storage and use; at the same time, the amount of alkali washing wastewater discharged by the device during the production process is 6340 tons/year.

As shown in FIG. 1, the method of this embodiment for treatment of the spent chloroaluminate ionic liquid catalyst and the alkaline wastewater includes the following steps.

1. Prepare Reagents

Prepare a sodium chloride solution with a concentration of about 15 wt % (i.e., concentrated brine) in a concentrated brine storage tank, and store it for use.

Prepare a sodium hydroxide solution with a concentration of about 30 wt % (i.e., extraneous alkaline solution) in an alkaline solution preparation tank, and store it for use.

Prepare a flocculant solution with a concentration of about 0.5 wt % in a flocculant preparation tank and store it for use; where the flocculant is anionic polyacrylamide with a relative molecular weight of 15 million and a charge density of 20%.

The above reagents are prepared with fresh water (such as tap water) before the start of operation; after operation, the preparation of the alkaline solution and the flocculant adopts condensed water from the drying device, and the preparation of the concentrated brine adopts concentrated brine from the flocculation sedimentation device and the mechanical dehydration device.

2. Hydrolysis Reaction

The spent catalyst of 255 kg/h is lifted by a fluoroplastic mechanical diaphragm pump, the concentrated brine of 12457 kg/h is lifted by a stainless steel centrifugal pump, and the spent catalyst and the concentrated brine are fed into the hydrolysis reactor with a feed volume ratio of 1:50 for hydrolysis reaction. The hydrolysis reaction is carried out in a plug flow packed bed reactor, the plug flow packed bed reactor is filled with structured packing, the spent catalyst and the concentrated brine are hydrolyzed in the packing layer in a plug flow state; where the Y-shaped corrugated orifice structured packing made of polyvinyl chloride is selected as the structured packing, its specific surface area is 350 m2/m3, porosity is 0.95 $m^3/m^3$, and airspeed of the packing layer of the hydrolysis reactor is controlled at 0.25 $h^{-1}$. When the pH value of hydrolysis reaction products is stabilized at about 2.6, the residual activity of the spent catalyst is completely eliminated.

The hydrolysis reaction products are separated by sedimentation to obtain acidic hydrolysate and acid-soluble oil respectively; where the pH value of the acidic hydrolysate is about 2.6 and content of the oil is about 120 mg/L; meanwhile, the acid-soluble oil of about 40 kg/h is recovered into the waste oil storage tank by itself for storage. The acid-soluble oil is composed of cyclopentadiene compounds, which can be periodically sent to a delayed coking device to be used as a raw material for reuse.

3. Neutralization Reaction

The acidic hydrolysate of 12672 kg/h is lifted by a fluoroplastic centrifugal pump, the alkali washing wastewater of 754 kg/h and the extraneous alkaline solution of 251 kg/h are lifted by a fluoroplastic metering pump, the acidic hydrolysate, the alkali washing wastewater and the extraneous alkaline solution are fed into the neutralization reactor with a feed volume ratio of 50:3:1 for neutralization reaction. The neutralization reaction is carried out in a complete-mixing flow reactor, and the acidic hydrolysate, the alkali washing wastewater and the extraneous alkaline solution are rapidly neutralized in a complete-mixing flow state; where the airspeed of the neutralization reactor is controlled to 1 $h^{-1}$, when the pH value of the neutralization solution reaches about 8.5, the acidic hydrolysate is completely neutralized, and at the same time, the oil content of the neutralization solution is about 120 mg/L, the content of sodium chloride is about 20 wt %, and the content of aluminum hydroxide/copper hydroxide flocs is about 2.8 wt %.

4. Flocculation

Add 0.5 wt % of the flocculant solution to the neutralization solution, and control the mass ratio of the neutralization solution to the flocculant solution to 230:1 (that is, the addition amount of flocculant is about 22 g per ton of the neutralization solution), after being fully mixed in the pipeline mixer, they flow into the flocculation sedimentation device by themselves for sedimentation and separation.

After 2 hours of sedimentation and separation, the volume of the concentrated floc layer accounts for about 25% of the volume of materials in the flocculation sedimentation device, and the content of the concentrated brine of the concentrated flocs is about 90 wt %. In the flocculation sedimentation device, 75 wt % of the volume of the materials is the concentrated brine, and the petroleum content is about 150 mg/L, the concentrated brine flows into the concentrated brine storage tank by itself and is reused in the hydrolysis reactor.

5. Dehydration Treatment

The concentrated flocs are transported by a stainless steel screw pump into a centrifugal dehydrator (i.e., a mechanical dehydration device) for dehydration treatment, where a separation factor of the centrifugal dehydrator is about 3000; a wet solid slag with a moisture content of about 70 wt % generated by dehydration is discharged by itself into a silo, and the oil content of the concentrated brine separated from the concentrated flocs is 100 mg/L, the concentrated brine flows into the concentrated brine storage tank by itself and is reused in the hydrolysis reactor.

6. Drying Treatment

The wet solid slag in the silo is sent to a thin-layer dryer (i.e., drying device) via a stainless steel screw conveyor to generate a dry solid slag of 454 kg/h with a moisture content of 15 wt %. In the dry solid slag, the content of sodium chloride is about 54.7 wt %, the content of aluminum hydroxide is about 22.5 wt %, the content of copper hydroxide is about 6.7 wt %, and the oil content is less than 1 wt %, the dry solid slag can be delivered away as general solid waste or used as a metallurgical raw material.

The condensed water CODcr produced by the thin-layer dryer during the drying process is about 500 mg/L, almost free of oil and salt, flows into the condensed water storage tank by itself, and is reused for the preparation of the alkaline solution and the flocculant solution.

Figure 2:
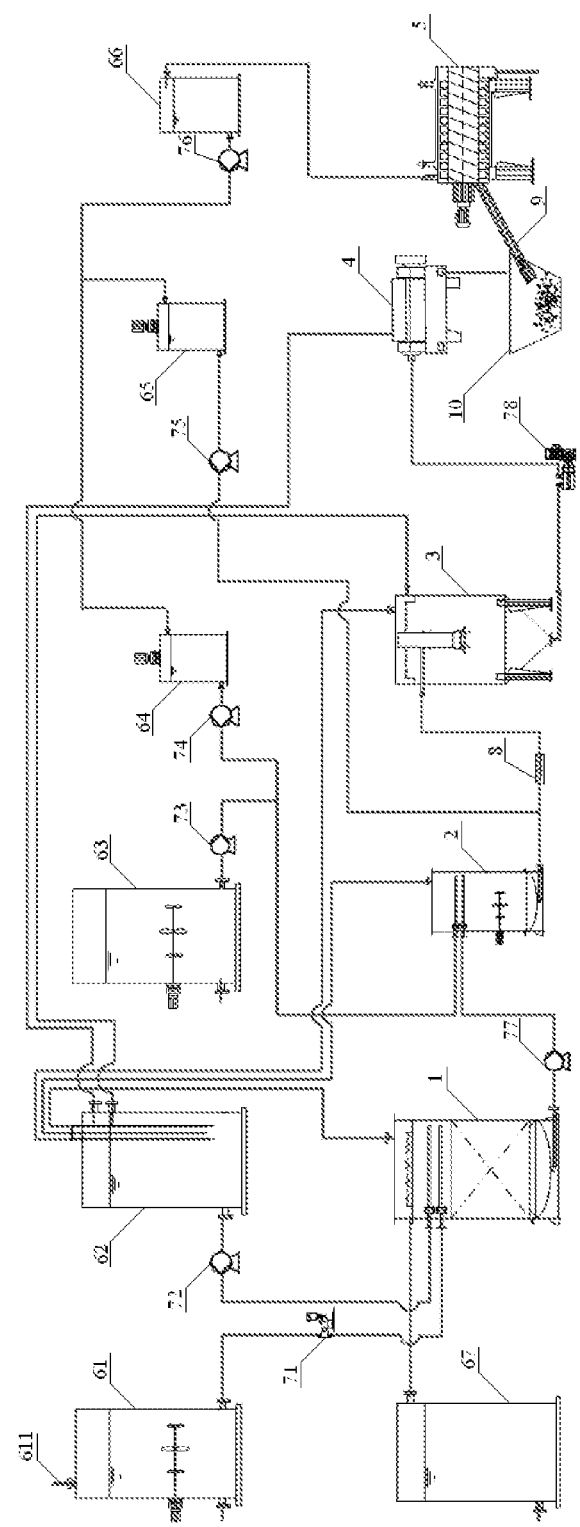
FIG. 2 is a schematic structural diagram of a system for treatment of a spent chloroaluminate ionic liquid catalyst and an alkaline wastewater according to an embodiment of the present disclosure.

For the implementation of the above processing procedure, reference may also be made to the schematic diagram of the processing system shown in FIG. 2.

After the above treatment, the recovery rate of the acid-soluble oil in the spent catalyst reaches about 90%; in addition, after testing, the moisture content of the recovered acid-soluble oil is about 1 wt %, no carbon particle impurity is detected, and the quality of the recovered oil is high.

Embodiment 2

In this embodiment, the method for treatment of the spent chloroaluminate ionic liquid catalyst and the alkaline wastewater includes the following steps.

1. Prepare Reagents

Prepare a sodium chloride solution with a concentration of about 22 wt % (i.e., concentrated brine) in a concentrated brine storage tank, and store it for use.

Prepare a sodium hydroxide solution with a concentration of about 30 wt % (i.e., extraneous alkaline solution) in an alkaline solution preparation tank, and store it for use.

Prepare a flocculant solution with a concentration of about 0.5 wt % in a flocculant preparation tank and store it for use; where the flocculant is anionic polyacrylamide with a relative molecular weight of 18 million and a charge density of 10%.

The above reagents are prepared with fresh water (such as tap water) before the start of operation; after operation, the preparation of the alkaline solution and the flocculant adopts condensed water from the drying device, and the preparation of the concentrated brine adopts concentrated brine from flocculation sedimentation device and mechanical dehydration device. The treatment procedures and the system used still can refer to FIG. 1 and FIG. 2.

2. Hydrolysis Reaction

The spent catalyst is lifted by a fluoroplastic mechanical diaphragm pump, the concentrated brine is lifted by a stainless steel centrifugal pump, and the spent catalyst and the concentrated brine are fed into the hydrolysis reactor with a feed volume ratio of 1:60 for hydrolysis reaction. The hydrolysis reaction is carried out in a plug flow packed bed reactor, the plug flow packed bed reactor is filled with structured packing, the spent catalyst and the concentrated brine are hydrolyzed in the packing layer in a plug flow state; where the Y-shaped corrugated orifice structured packing made of polyvinyl chloride is selected as the structured packing, its specific surface area is 500 $m^2/m^3$, porosity is 0.97 $m^3/m^3$, and the airspeed of the packing layer of the hydrolysis reactor is controlled at 0.5 $h^{-1}$. When the pH value of the hydrolysis reaction product is stabilized at about 2.6, the residual activity of the spent catalyst is completely eliminated.

The hydrolysis reaction products are separated by sedimentation to obtain acidic hydrolysate and acid-soluble oil respectively; where the pH value of the acidic hydrolysate is about 2.6 and content of the oil is about 120 mg/L; meanwhile, the acid-soluble oil is recovered into the waste oil storage tank by itself for storage. The acid-soluble oil is composed of cyclopentadiene compounds, which can be periodically sent to a delayed coking device to be used as a raw material for reuse.

3. Neutralization Reaction

The acidic hydrolysate is lifted by a fluoroplastic centrifugal pump, the alkali washing wastewater and the extraneous alkaline solution are lifted by a fluoroplastic metering pump, the acidic hydrolysate, the alkali washing wastewater and the extraneous alkaline solution are fed into the neutralization reactor with a certain feed volume ratio for neutralization reaction, enabling the concentration of sodium chloride in the neutralization solution to be about 30 wt %. The neutralization reaction is carried out in a complete-mixing flow reactor, and the acidic hydrolysate, the alkali washing wastewater and the extraneous alkaline solution are rapidly neutralized in a complete-mixing flow state; where the airspeed of the neutralization reactor is controlled to 2 $h^{-1}$, when the pH value of the neutralization solution reaches about 8.5, the acidic hydrolysate is completely neutralized, and at this time, the oil content of the neutralization solution is about 60 mg/L, the content of sodium chloride is about 23 wt %, and the content of the aluminum hydroxide/copper hydroxide flocs is about 2.8 wt %.

4. Flocculation

Add 0.5 wt % of the flocculant solution to the neutralization solution, and control the addition amount of the flocculant to be about 30 g per ton of the neutralization solution, and after being fully mixed in the pipeline mixer, they flow into the flocculation sedimentation device by themselves for sedimentation and separation.

After 3 hours of sedimentation and separation, the volume of the concentrated floc layer accounts for about 20% of the volume of the materials in the flocculation sedimentation device, and the content of the concentrated brine of the concentrated flocs is about 85 wt %. In the flocculation sedimentation device, 97 wt % of the volume of the materials is concentrated brine, and the petroleum content is about 50 mg/L, the concentrated brine flows into the concentrated brine storage tank by itself and is reused in the hydrolysis reactor.

5. Dehydration Treatment

The concentrated flocs are transported by a stainless steel screw pump into a centrifugal dehydrator (i.e., a mechanical dehydration device) for dehydration treatment, where a separation factor of the centrifugal dehydrator is about 3000; a wet solid slag with a moisture content of about 70 wt % generated by dehydration is discharged by itself into a silo, and the oil content of the concentrated brine separated from the concentrated flocs is 50 mg/L, the concentrated brine flows into the concentrated brine storage tank by itself and is reused in the hydrolysis reactor.

6. Drying Treatment

The wet solid slag in the silo is sent to a thin-layer dryer (i.e., drying device) via a stainless steel screw conveyor to generate a dry solid slag with a moisture content of 15 wt %. In the dry solid slag, the content of sodium chloride is about 55 wt %, the content of aluminum hydroxide is about 22 wt %, the content of copper hydroxide is about 7 wt %, and the oil content is less than 1 wt %, the dry solid slag can be delivered away as general solid waste or used as a metallurgical raw material.

The condensed water CODcr produced by the thin-layer dryer during the drying process is about 500 mg/L, almost free of oil and salt, flows into the condensed water storage tank by itself, and is reused for the preparation of the alkaline solution and the flocculant solution.

After the above treatment, the recovery rate of the acid-soluble oil in the spent catalyst reaches about 90%; in addition, after testing, the moisture content of the recovered acid-soluble oil is about 1 wt %, no carbon particle impurity is detected, and the quality of the recovered oil is high.

Embodiment 3

With reference to FIG. 2 to FIG. 10, the system of the present disclosure for treatment of a spent chloroaluminate ionic liquid catalyst and an alkaline wastewater includes a hydrolysis reactor 1, a neutralization reactor 2, a flocculation sedimentation system, a mechanical dehydration device 4 and a drying device 5; the hydrolysis reactor 1 is used to mix the spent chloroaluminate ionic liquid catalyst with the concentrated brine for hydrolysis reaction; the neutralization reactor 2 is connected to the hydrolysis reactor 1, and is used to mix the acidic hydrolysate generated by the hydrolysis reaction with the alkaline solution containing the alkaline wastewater for neutralization reaction; the flocculation sedimentation system is connected to the neutralization reactor 2, and is used to fully mix the neutralization liquid produced by the neutralization reaction with the flocculant and implement sedimentation and separation; the mechanical dehydration device 4 is connected to the flocculation sedimentation system and is used to dehydrate the concentrated flocs formed by sedimentation and separation; the drying device 5 is connected to the mechanical dehydration device 4 and is used to dry the wet solid slag formed by the dehydration treatment.

In the system of the present disclosure, the hydrolysis reactor 1 and the neutralization reactor 2 are separately provided, so that before the alkaline solution is used to neutralize the spent catalyst, the spent chloroaluminate ionic liquid catalyst and the concentrated brine are mixed in the hydrolysis reactor 1 for the hydrolysis reaction; in the hydrolysis reactor 1, a large amount of concentrated brine can quickly disperse the heat generated by the hydrolysis reaction during the hydrolysis process of the spent catalyst, thereby interrupting the self-accelerating mechanism of the hydrolysis reaction; at the same time; at the same time, the high concentration of chloride ions in the concentrated brine increases the concentration of the hydrolysis product, which has a certain inhibitory effect on the hydrolysis reaction. The above method can not only gently eliminate the activity of the spent catalyst, but also eliminate the promoting effect of the neutralization reaction heat on the hydrolysis reaction rate, and thereby make the operation process of the entire system more stable and safe.

The system of the present disclosure can be used in the method of Embodiment 1 or Embodiment 2; the structures of components of the system of the present disclosure will be described in detail below.

1. Hydrolysis Reactor

In an embodiment, the hydrolysis reactor 1 is configured as a plug flow packed bed reactor, which can make the hydrolysis reaction more gentle, thereby achieving gentle hydrolysis; at this time, the spent catalyst and the concentrated brine are in contact in the hydrolysis reactor 1 in a plug flow state, the degree of materials back-mixing is low, the disturbance to the spent catalyst droplets is small, and the mass transfer between the active components and the moisture is weakened, which not only reduces the intensity of the hydrolysis reaction, but also facilitates the separation and recovery of the acid-soluble oil.

Further, the structured packing is filled in the plug flow packed bed reactor, which manner comprehensively utilizes the high viscosity characteristics of the spent catalyst, the boundary layer characteristics on the surface of the packing, and the interception of the packing on the catalyst; due to the high viscosity and the small amount of feed, the spent catalyst flows in a film-like laminar flow on the surface of the structured packing and forms a thick laminar boundary layer, the larger viscous force enables the sedimentation rate of the spent catalyst to be effectively controlled. In addition, due to the existence of the laminar flow bottom layer in the boundary layer, the mass transfer resistance between the materials increases, and thus the mass transfer efficiency between the spent catalyst and the concentrated brine is also effectively controlled. Compared with random packing, material circulation channels of the structured packing are uniform, and channeling is not easy to occur.

In particular, the use of high-flux structured packing can provide a smooth flow path for the concentrated brine, and basically maintain a laminar flow state, and meanwhile weaken the mass transfer with the spent catalyst. During the hydrolysis reaction, the spent catalyst is evenly distributed in pores of the structured packing, forming a large number of micro-element reaction environments, and the contact time between a large amount of the concentrated brine and the spent catalyst is long, thereby ensuring complete hydrolysis of the spent catalyst. Specifically, the porosity of the structured packing is 0.95-0.97 m$^3$/m$^3$, and the specific surface area is 300-500 m$^2$/m$^3$; at this time, the rate of the hydrolysis reaction is well controlled, which is not easy to cause blockage of the pores, and the hydrolysis reaction is easy to proceed completely.

Further, the structured packing may be an oleophobic packing and may have an inclined plate structure; the structured packing can also promote the coarsening of acid-soluble oil droplets, making it easier for large-particle oil droplets to float, thereby facilitating the recovery of the acid-soluble oil. The present disclosure does not strictly limit the specific structure and material of the structured packing; the structured packing can be, for example, a Y-shaped corrugated orifice structured packing, etc., and an inclination angle between the corrugation to axis can be about 45°, so that the interception effect on the spent catalyst droplets is good. In addition, the material of the structured packing can be polyethylene (PE), polyvinyl chloride (PVC) or polyvinylidene fluoride (PVDF), which are oleophobic and resistant to acid and chlorine corrosions and are conducive to coarsening of the acid-soluble oil, thereby facilitating recovery of the acid-soluble oil.

In particular, the airspeed of the plug flow packed bed reactor described above may be 0.25-0.5 h$^{-1}$. Where when the airspeed is 0.5 h$^{-1}$, the spent catalyst can be completely hydrolyzed and the pH value can be stabilized at 2.5-2.8; and when the airspeed is 0.25 h$^{-1}$, the oil content of the acid hydrolysate is the lowest, and the acid-soluble oil recovered is the most.

Figure 3:
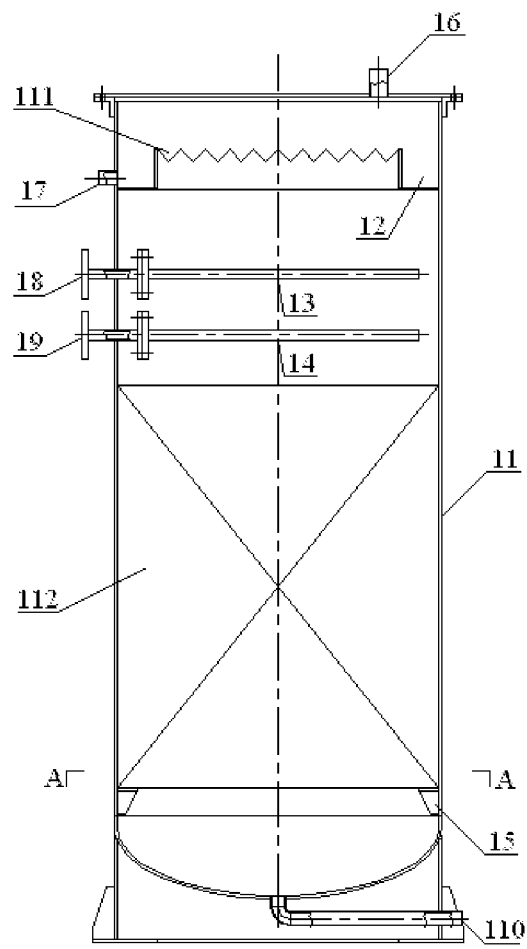
FIG. 3 is a schematic structural diagram of a hydrolysis reactor according to an embodiment of the present disclosure.
Figure 4:
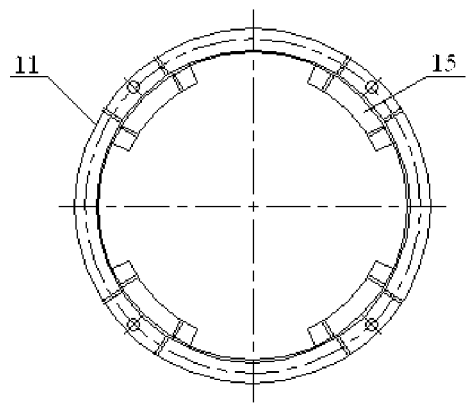
FIG. 4 is a schematic cross-sectional view taken along A-A in FIG. 3.
Figure 5:
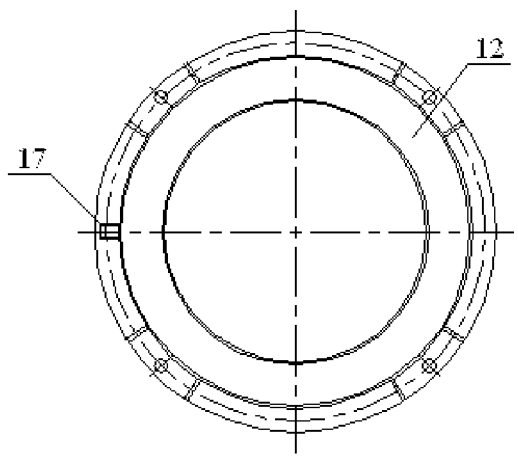
FIG. 5 is a schematic structural diagram of an annular oil collecting groove of a hydrolysis reactor according to an embodiment of the present disclosure.

As shown in FIG. 3 to FIG. 5, the hydrolysis reactor 1 includes a shell 11. An annular oil collecting groove 12, a water distributor 13 for distributing concentrated brine and a material distributor 14 for distributing the spent chloroaluminate ionic liquid catalysts are sequentially arranged at the upper part of the shell 11 from top to bottom; a packing support bracket 15 for supporting the packing is provided at a lower part of the shell 11; an exhaust port 16 is provided at the top of the shell 11; an oil outlet 17, a water inlet 18 and a feed inlet 19 are provided on a side wall of the shell 11, the oil outlet 17 is in communication with the annular oil collecting groove 12, the water inlet 18 is in communication with the water distributor 13, the feed inlet 19 is in communication with the material distributor 14; and a liquid outlet 110 is provided at the bottom of the shell 11.

It can be understood that the structured packing described above is packed on the packing support bracket 15 (see FIG. 4) to form a packing layer 112; in addition, an overflow weir 111 can also be provided above the annular oil collecting groove 12, to maintain the oil layer and make the acid-soluble oil evenly overflow.

Further, in view of the fact that the spent catalyst has extremely strong acidity, the viscosity up to 600-800 mPa·s, and contains a small amount of mechanical impurities, in order to prevent clogging and corrosion, it is preferable to use a mechanical diaphragm pump 71 made of a fluoroplastic material to transport it; in addition, the content of sodium chloride in the concentrated brine is as high as 15-22 wt %, having highly corrosive, it is preferable to use a centrifugal pump 72 made of stainless steel to transport it.

In the above-mentioned hydrolysis reactor 1, the spent catalyst is mixed with concentrated brine to carry out the hydrolysis reaction, the acid-soluble hydrocarbons in the spent catalyst are separated from the active components, to form the acid-soluble oil, which floats to the liquid surface, and is collected by the annular oil collecting groove 12, and then flows into the waste oil storage tank 67 by itself through the oil outlet 17 and its pipeline for refining (see FIG. 5). In particular, in the above-mentioned hydrolysis reactor 1, the water inlet 18 and the water distributor 13 are respectively arranged above the feed inlet 19 and the material distributor 14, which not only facilitates the dispersion of the spent catalyst by the concentrated brine, but can also enable the area where the spent catalyst undergoes hydrolysis reaction away from the acid-soluble oil layer, avoiding the influence of the local exothermic heat of hydrolysis on the quality and recovery rate of the acid-soluble oil.

In addition, the active components and the acid-soluble hydrocarbons contained in the spent catalyst will produce volatile organic pollutants (VOCs) and hydrogen chloride during the hydrolysis process, which are concentrated at the top of the hydrolysis reactor 1, and in order to avoid air pollution, an exhaust port 16 can be set at the top of the hydrolysis reactor 1, and the gas can be led to the water seal port of the concentrated brine storage tank 62, the concentrated brine in the concentrated brine storage tank 62 can not only absorb these gaseous pollutants, but also use the liquid level for water sealing; the water seal can also provide a positive pressure for the hydrolysis reactor 1 and promote the reabsorption of these pollutants by the acidic hydrolysate.

In the present disclosure, the structure of the water distributor 13 and the material distributor 14 of the hydrolysis reactor 1 is not strictly limited, as long as they can evenly distribute the concentrated brine and the spent catalyst in the hydrolysis reactor 1.

Figure 6:
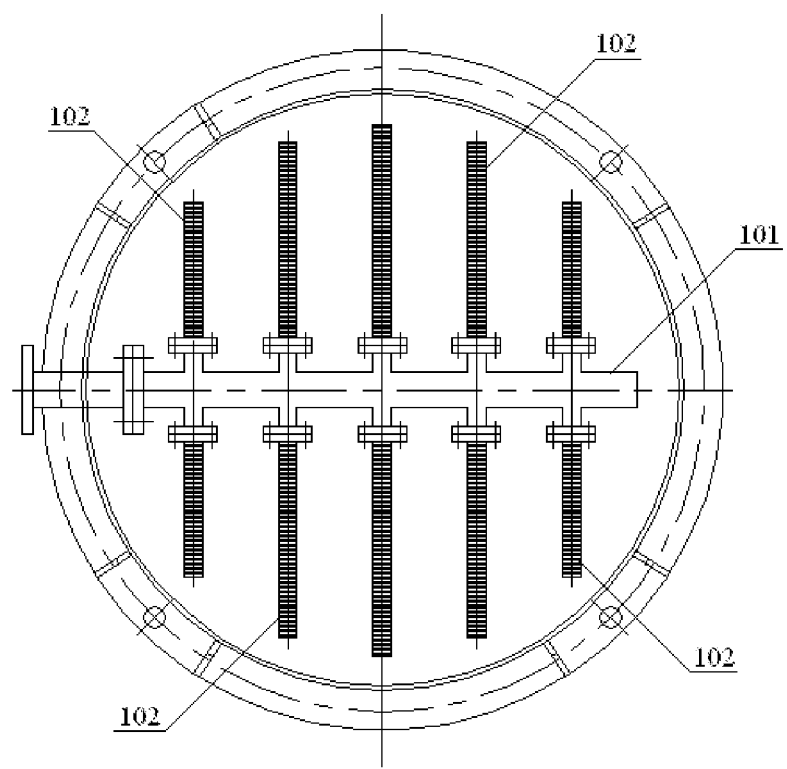
FIG. 6 is a schematic structural diagram of a water distributor according to an embodiment of the present disclosure.

Specifically, as shown in FIG. 6, in an embodiment, the water distributor 13 includes a water distribution main pipe 101, and a plurality of parallel water distribution branch pipes 102 arranged at equal intervals are respectively provided on both sides of the water distribution main pipe 101, a plurality of water distribution holes (not shown) are distributed at the bottom of each water distribution branch pipe 102, and the total opening area of the water distribution holes accounts for more than 1% of the cross-sectional area of the hydrolysis reactor 1. At this time, the water distributor 13 is fishbone type; where a spacing between adjacent water distribution branch pipes 102 can be set to more than 5 cm, so as to avoid affecting the floating and pooling of the acid-soluble oil; in addition, the arrangement manner of the water distribution holes on the water distribution branch pipes 102 is not strictly limited, and the plurality of water distribution holes can be arranged at equal intervals, and the apertures of the plurality of water distribution holes can be set to be the same.

The water distributor 13 with the above structure has a large opening area and a large number of openings, thereby facilitating a uniform distribution of the concentrated brine; in addition, due to low out-of-hole flow rate and low back-mixing of the water distribution holes, a laminar flow is formed in the hydrolysis reactor 1, which weakens the mass transfer with the spent catalyst, has little disturbance to the acid-soluble oil layer on the hydrolysis liquid surface, and is more conducive to the recovery of the acid-soluble oil.

Figure 7:
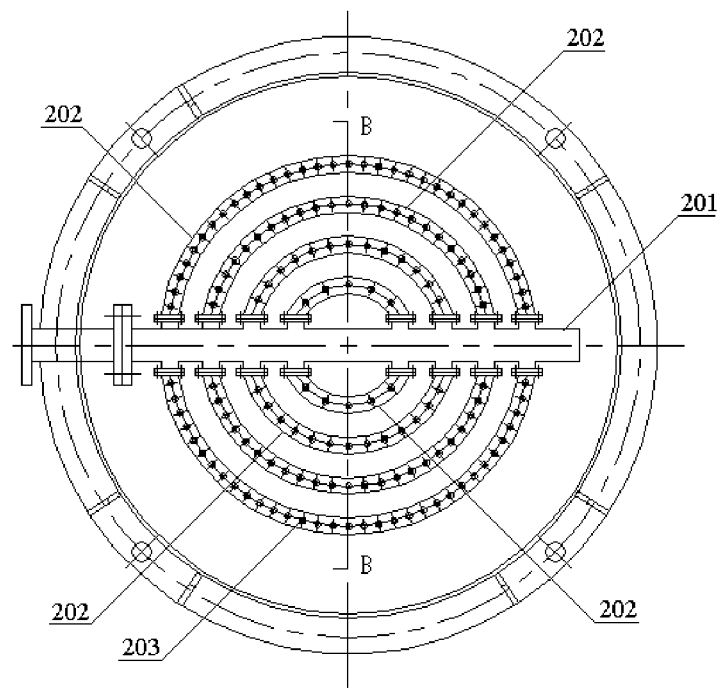
FIG. 7 is a schematic structural diagram of a material distributor according to an embodiment of the present disclosure.
Figure 8:
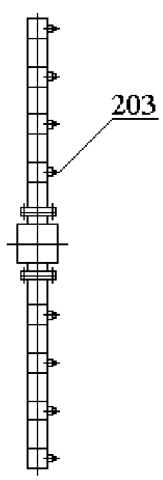
FIG. 8 is a schematic cross-sectional view taken along B-B in FIG. 7.

As shown in FIG. 7 and FIG. 8, in an embodiment, the material distributor 14 includes a material distribution main pipe 201, a plurality of semicircular material distribution branch pipes 202 arranged concentrically and at equal intervals are respectively provided on both sides of the material distribution main pipe 201, a plurality of material distribution holes 203 (see FIG. 7) are distributed at the bottom of each semicircular material distribution branch pipe 202, and the total opening area of the material distribution holes 203 accounts for more than 2% of the cross-sectional area of the hydrolysis reactor 1. At this time, the material distributor 14 is ring-shaped; where a spacing between adjacent distribution branch pipes 202 can be set to more than 5 cm, so as to avoid affecting the floating and pooling of the acid-soluble oil; in addition, the arrangement manner of the material distribution holes 203 on the material distribution branch pipes 202 is not strictly limited, the plurality of material distribution holes 203 can be arranged at equal intervals, and the apertures of the plurality of material distribution holes 203 can be set to be the same, and the inner diameter of the material distribution holes 203, for example, can be set to 3-5 mm.

The material distributor 14 with the above structure has a large opening area and a large number of material distribution holes, thereby facilitating a uniform distribution of the spent catalyst; in addition, due to small inner diameter of the material distribution holes 203, the spent catalyst is extruded out as small droplets, which is more conducive to its dispersion in the concentrated brine.

2. Neutralization Reactor

The neutralization reactor 2 is used to mix the acidic hydrolysate generated by the hydrolysis reaction with the alkaline solution containing the alkaline wastewater for neutralization; the specific structure of the neutralization reactor 2 is not strictly limited, and a conventional neutralization reactor in this field can be used.

Figure 9:
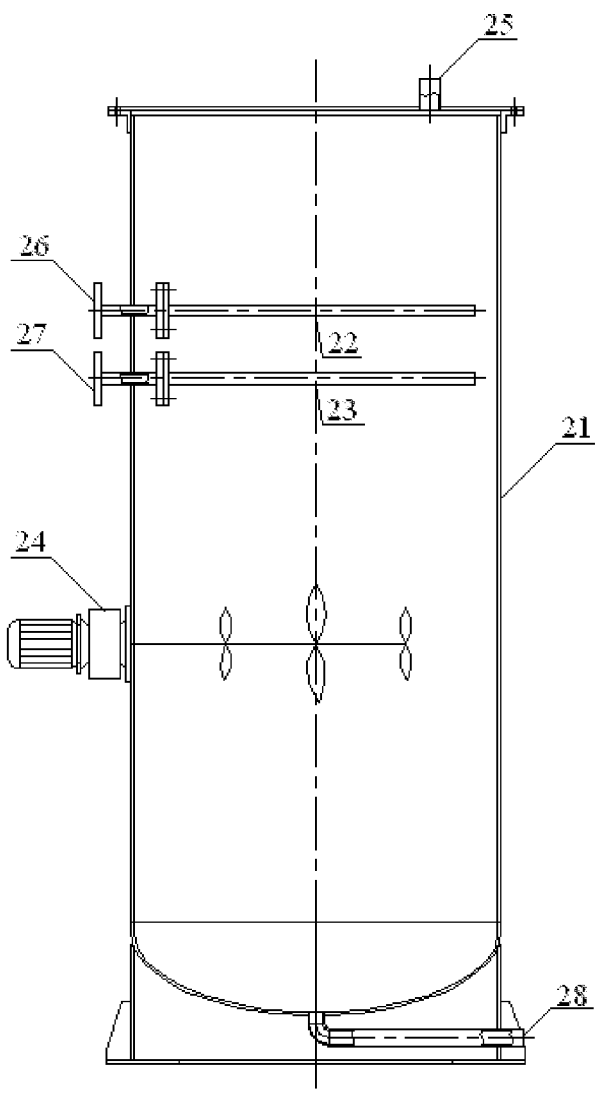
FIG. 9 is a schematic structural diagram of a neutralization reactor according to an embodiment of the present disclosure.

Specifically, the neutralization reactor 2 is a complete-mixing flow reactor; as shown in FIG. 9, the neutralization reactor 2 includes a shell 21. A water distributor 22 for distributing the alkaline solution and a material distributor 23 for distributing the acidic hydrolysate are sequentially arranged at an upper part of the shell from top to bottom; a side-entry agitator 24 is provided in the middle of the shell 21; an exhaust port 25 is provided at the top of the shell 21; an alkali inlet 26 and a liquid inlet 27 are provided on a side wall of the shell 21, the alkali inlet 26 is in communication with the water distributor 22, the liquid inlet 27 is in communication with the material distributor 23; and a liquid outlet 28 is provided at the bottom of the shell 21.

The alkali inlet 26 and the water distributor 22 of the neutralization reactor 2 are arranged above the liquid inlet 27 and the material distributor 23, which can make the position of the metal hydroxide flocs generated by the neutralization reaction to be lower, so that the water distributor 22 is not easily blocked. In particular, the use of the side-entry agitator 24 accelerates the mass transfer and neutralization reaction between the acidic hydrolysate and the alkaline solution, and at the same time prevents premature precipitation of the flocs to block the liquid outlet 28 and its pipeline.

Preferably, a centrifugal pump 27 made of a fluoroplastic material can be used to transport the acidic hydrolysate with high chlorine content; the alkali washing wastewater and the extraneous alkaline solution have high chlorine content and high alkali content, and need to be accurately proportioned with the acidic hydrolysate to achieve neutralization, therefore, it is preferable to use metering pumps 73, 74 made of fluoroplastic material to transport the alkali washing wastewater and the extraneous alkaline solution. In addition, since both the acidic hydrolysate and the alkali washing wastewater carry a small amount of oil, the neutralization process will cause the enrichment of VOCs at the top of the neutralization reactor 2; in order to prevent air pollution, an exhaust port 25 can be set at the top of the neutralization reactor 2, and the gas can be led to the water seal port of the concentrated brine storage tank 62, the concentrated brine in the concentrated brine storage tank 62 can not only absorb these gaseous pollutants, but also use the liquid level for water sealing; the water sealing can also provide a positive pressure for the neutralization reactor 2, thereby promoting the reabsorption of these pollutants by the neutralization solution.

The structures of the water distributor 22 and the material distributor 23 of the neutralization reactor 2 are not strictly limited, as long as the alkaline solution and the acidic hydrolysate can be evenly distributed in the neutralization reactor 2, and they can use the same structure as in the hydrolysis reactor 1. The alkali washing wastewater is combined with the extraneous alkaline solution and then is distributed in the neutralization reactor 2 through the fishbone type of water distributor 22 above, due to large opening area and large number of openings in the water distributor 22, the uniform distribution of the alkali washing wastewater and the extraneous alkaline solution in the neutralization reactor 2 is it promoted; in addition, the acidic hydrolysate is distributed in the neutralization reactor 2 through the above-mentioned ring-shaped material distributor 23, the material distributor 23 has a small opening area, a small number of material distribution holes and a small inner diameter of material distribution holes, and forms a local turbulence after the liquid is discharged, which helps the mass transfer and neutralization reaction between the acidic hydrolysate and the alkaline solution.

3. Flocculation Sedimentation System

The flocculation sedimentation system is used to fully mix the neutralization solution produced by the neutralization reaction with the flocculant and implement sedimentation and separation; the specific structure of the flocculation sedimentation system is not strictly limited, and conventional structures in the field can be adopted.

Figure 10:
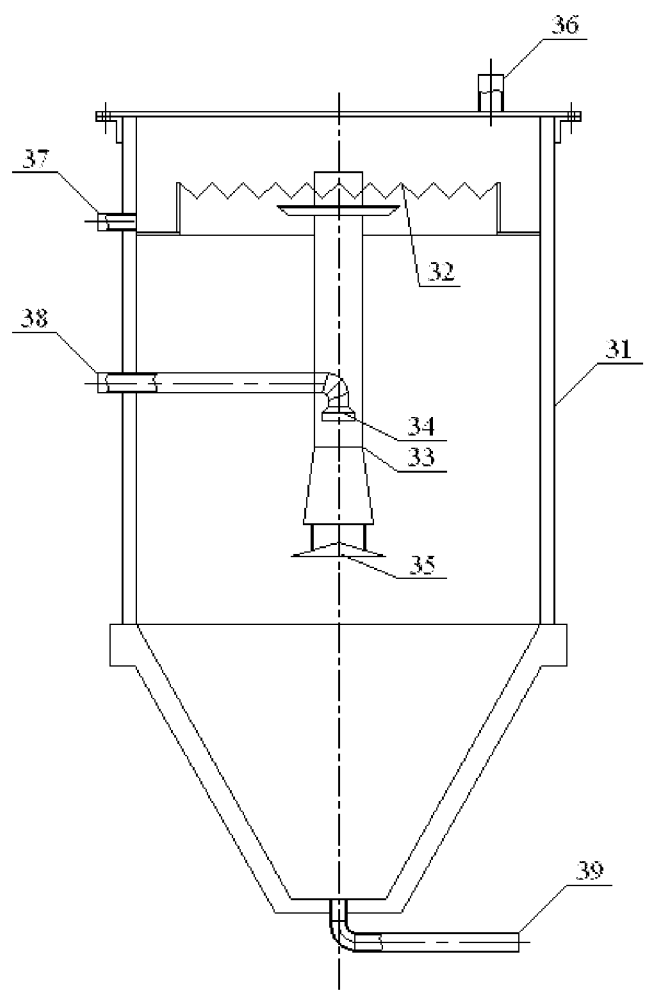
FIG. 10 is a schematic structural diagram of a flocculation sedimentation device according to an embodiment of the present disclosure.

Specifically, the flocculation sedimentation system includes a pipeline mixer 8 and a flocculation sedimentation device 3 arranged in sequence; as shown in FIG. 10, the flocculation sedimentation device 3 includes a sealed shell 31. An annular overflow weir 32, a central pipe 33 and a material distribution pipe 34 are arranged inside the sealed shell 31, the material distribution pipe 34 is arranged inside the central pipe 33, an umbrella-shaped baffle 35 is provided at the bottom of the central pipe 33; an exhaust port 36 is provided at the top of the sealed shell 31; a water outlet 37 and a feed inlet 38 are provided on the side wall of the sealed shell 31, the water outlet 37 is in communication with the annular overflow weir 32, the feed inlet 38 is in communication with the material distribution pipe 34; and a slag outlet 39 is provided at the bottom of the sealed shell 31.

It can be understood that the liquid outlet 28 of the neutralization reactor 2 is connected to an inlet of the pipeline mixer 8 through a pipeline, a reagent inlet is provided on a connecting pipeline between the liquid outlet 28 of the neutralization reactor 2 and the inlet of the pipeline mixer 8, and the reagent outlet of the flocculant preparation tank 65 is connected with the reagent inlet through a metering pump 75 made of stainless steel and a pipeline. In the present disclosure, the pipeline mixer 8 is convenient to achieve sufficient contact between the neutralization solution and the flocculant; in addition, a metering pump 75 made of stainless steel is used for feeding, which is convenient for accurately proportioning the flocculant and the neutralization solution to achieve the best flocculation effect.

The flocculation sedimentation device 3 with the above-mentioned structure is in the form of a sealed vertical flow sedimentation tank; the neutralization solution containing flocs and the flocculant are fully mixed through the pipeline mixer 8 and flow into the flocculation sedimentation device 3 by itself for sedimentation and separation, the then moisture content of the concentrated flocs is reduced, which reduces the subsequent processing load of the mechanical dehydration device 4, and at the same time, the concentrated brine precipitated can be reused in the hydrolysis reactor 1. Since gaseous pollutants may be escaped from materials in the flocculation sedimentation device 3, a sealed form is adopted, and at the same time, an exhaust port 36 set on the top of the flocculation sedimentation device 3 guides the gas to the concentrated brine storage tank 62 for water sealing. In particular, based on the maturity of the separation equipment and the ease of operation, the flocculation sedimentation device 3 in the form of the vertical flow sedimentation tank is used to separate the concentrated brine from the flocs; the neutralization solution is mixed with the flocculant and then enters the flocculation sedimentation device 3 through the feed inlet 38, the neutralization solution is injected by the material distribution pipe 34 down into the central pipe 33, and is baffled through the umbrella-shaped baffle 35, and then the metal hydroxide flocs precipitate and concentrate to the bottom of the flocculation sedimentation device 3; at the same time, the concentrated brine is lifted to the top of the flocculation sedimentation device 3, and flows into the concentrated brine storage tank 62 by itself through the annular overflow weir 32 and the water outlet 37. When a certain precipitation time is reached, an interface between concentrated flocs and the concentrated brine becomes clear, and the concentrated brine has almost no entrainment of flocs.

4. Mechanical Dehydration Device

The mechanical dehydration device 4 is used to dehydrate the concentrated flocs, thereby significantly reducing the amount of the solid slag; considering that the concentrated flocs have a solid content of about 2-3 wt % and contain the concentrated brine, a screw pump 78 made of stainless steel can be used for transportation. In addition, the moisture in the concentrated flocs is mainly free water, so a conventional plate and frame filter press or a centrifugal dehydrator can be used to obtain a good dehydration effect. In view of the shortcomings of the plate and frame filter press, such as large area, long processing time, and incapable of continuous operation, the mechanical dehydration device 4 is preferably a centrifugal dehydrator, whose separation factor can be about 3000, and at this time, the concentrated flocs can be prepared into a wet solid slag with a moisture content of 60-70%.

5. Drying Device

The drying device 5 is used to dry the wet solid slag formed by the mechanical dehydration treatment, so as to continue to reduce the output of the solid slag and facilitate reuse. Where a screw conveyor 9 can be used to convey the wet solid slag; this conveying method is relatively clean and avoids the phenomenon of slag drop in a belt transmission.

The moisture in the wet solid slag is mainly capillary water, and it is difficult to continue to reduce its moisture content and solid slag output regardless of the plate and frame filter press or the centrifugal dehydration method, it is more suitable to use the drying method to dehumidify and dry. Therefore, the drying device 5 can adopt a thin-layer dryer or a low-temperature dehumidification dryer, which can dry the wet solid slag into a dry solid slag with a moisture content of 10-20%.

The thin-layer dryer, which couples a conduction principle and a radiation drying principle, generally adopts an indirect heating method of thermal fluid, which may quickly vaporize the moisture in the wet solid slag, but has high energy consumption and equipment investment; the low-temperature dehumidification dryer, which is based on a principle of convection drying, generally adopts an electric direct heating method, whose gasification and dehumidification speed is slower than that of the thin-layer dryer, but the equipment investment is low and the process operation is simple. In the presence of waste heat medium (such as steam) that can be used, a thin-layer dryer is preferably used. Since the moisture in the dry solid slag is mainly crystal water, continuing to reduce the moisture content is not only inefficient but also uneconomical.

In addition, the moisture in the wet solid slag will be converted into water vapor during the dehumidifying and drying process, and recovering the latent heat of water vapor and reusing it in the drying process is more beneficial to reducing energy consumption. Therefore, the system of the present disclosure may further include a heat recovery device (i.e., a condensed water storage tank 6666), which is used to recover the condensed water generated by the above-mentioned drying device 5; due to a low pollution load, the recovered condensed water can be reused for the preparation of the extraneous alkaline solution and the flocculant.

6. Other Matching Parts

It is understandable that, in addition to the above-mentioned main parts, the system of the present disclosure can further include other supporting parts, including a spent catalyst storage tank 61, a concentrated brine storage tank 62, an alkali washing wastewater storage tank 63, an extraneous alkaline solution preparation tank 64, a flocculant preparation tank 65, a condensed water storage tank 66, a waste oil storage tank 67, and various pumps and conveyors for conveying materials, etc., all of them can use conventional devices or parts in the field, and can be set in conventional manners.

Specifically, the spent catalyst storage tank 61 includes a tank body. A side-entry agitator is arranged inside the tank body, a feed inlet and a feed outlet are provided at the lower end of the side wall of the tank body, a discharge port is provided at the bottom of the tank body, and a gas inlet 611 is provided at the top of the tank body; where the side-entry agitator is used to homogenize and equalize the spent catalyst from different periods of time, the gas inlet 611 is used to fill the top of the spent catalyst storage tank 61 with nitrogen for protection to avoid the spent catalyst contacting moisture in the air, and to prevent explosion due to hydrolysis.

The concentrated brine storage tank 62 includes a tank body and a water seal pipe. A water inlet is provided at the upper end of a side wall of the tank body, a water outlet is provided at the lower end of a side wall of the tank body, a discharge port is provided at the bottom of the tank body, a water seal port is provided at the top of the tank body, and the water seal pipe is connected with the water seal port. Setting a concentrated brine storage tank 62 not only provides a space for storage of the concentrated brine as an intermediate product, but also provides a raw material for the hydrolysis reaction, being a key node for recycling of the intermediate product in the entire system; at the same time, the water sealing can also control the escape of gaseous pollutants in the hydrolysis reactor, the neutralization reactor and the flocculation sedimentation device, which avoids air pollution.

The alkali washing wastewater storage tank 63 includes a tank body, a side-entry agitator is provided inside the tank body, a water inlet and a water outlet are provided at the lower end of a side wall of the tank body, and a discharge port is provided at the bottom of the tank body; where the side-entry agitator is used to homogenize and equalize the alkali washing wastewater from different periods.

The condensed water storage tank 66 includes a tank body, a water inlet is provided at the upper end of a side wall of the tank body, a condensed water outlet is provided at the lower end of a side wall of the tank body, and a discharge port is provided at the bottom of the tank body. Setting a condensed water storage tank 66 not only provides a space for the storage of the condensed water as an intermediate product, but also provides a water source for the preparation of the extraneous alkaline solution and the flocculant, being an important node for recycling of the intermediate product in the entire system.

Further, the spent catalyst storage tank 61 is connected to the feed inlet 19 of the hydrolysis reactor 1 through the mechanical diaphragm pump 71, the concentrated brine storage tank 62 is connected to the water inlet 18 of the hydrolysis reactor 1 through the centrifugal pump 72, and the oil outlet 17 of the hydrolysis reactor 1 is connected to the waste oil storage tank 67.

Further, the liquid outlet 110 of the hydrolysis reactor 1 is connected to the liquid inlet 27 of the neutralization reactor 2 through a centrifugal pump 77, the alkali washing wastewater storage tank 63 and the extraneous alkaline solution preparation tank 64 are respectively connected to the alkaline inlet 26 of the neutralization reactor 2 through the metering pumps 73 and 74, and the liquid outlet 28 of the neutralization reactor 2 is connected to the inlet of the pipeline mixer 8.

Further, the outlet of the pipeline mixer 8 is connected to the feed inlet 38 of the flocculation sedimentation device 3, and the slag outlet 39 of the flocculation sedimentation device 3 is connected to the inlet of the mechanical dehydration device 4 through a screw pump 78.

Further, the slag outlet port of the mechanical dehydration device 4 is connected to a silo 10; the silo 10 is connected to the inlet of the drying device 5 through the screw conveyor 9; in addition, the condensed water storage tank 66 is connected to the drying device 5 to recover the condensed water. The condensed water storage tank 66 is also connected to the water inlet of the extraneous alkaline solution preparation tank 64 and the water inlet of the flocculant preparation tank 65 through the metering pump 76.

In particular, the exhaust port 16 of the hydrolysis reactor 1, the exhaust port 25 of the neutralization reactor 2, the water outlet 37 and the exhaust port 36 of the flocculation sedimentation device are connected to the water seal port of the concentrated brine storage tank 62 through pipelines.

In addition, the flocculation sedimentation device 3 and the mechanical dehydration device 4 have a concentrated brine outlet, which is connected to the concentrated brine storage tank 62, so as to facilitate the reuse of the concentrated brine.

The system of the present disclosure uses a hydrolysis reactor 1 and a neutralization reactor 2 to realize harmlessness of a spent catalyst and an alkali washing wastewater and recovery of oil resources; and uses a flocculation sedimentation system, a mechanical dehydration device 4 and a drying device 5 to achieve reduction and resourcelization of a metal solid slag; in addition, uses a concentrated brine storage tank 62 and a condensed water storage tank 66 to realize recycling of an intermediate product. The whole system has gentle running process and safe operation process, has no new pollution sources and has a high recovery rate of resources, especially, the recovered acid-soluble oil has low water and impurity contents and a high oil quality.

Finally, it should be noted that the above embodiments are only used to illustrate the technical solutions of the present disclosure, not to limit them; those of ordinary skill in the art should understand that they can still modify the technical solutions described in the foregoing embodiments, or equivalently replace some or all of the technical features therein; however, these modifications or replacements do not cause the essence of the corresponding technical solutions to deviate from the scope of the technical solutions of the embodiments of the present disclosure.

What is claimed is:

1. A method for treatment of a spent chloroaluminate ionic liquid catalyst and an alkaline wastewater, comprising the following steps:
    1) mixing the spent chloroaluminate ionic liquid catalyst with a concentrated brine for hydrolysis reaction until a residual activity of the spent chloroaluminate ionic liquid catalyst is completely eliminated, and separating products of the hydrolysis reaction to obtain an acidic hydrolysate and an acid-soluble oil respectively;
    2) mixing the acidic hydrolysate with an alkaline solution containing the alkaline wastewater for neutralization reaction until this reaction system becomes weak alkaline, to obtain a concentrated brine and a neutralization solution containing metal hydroxide flocs;
    3) fully mixing the neutralization solution with a flocculant and implementing sedimentation and separation to obtain the concentrated brine at an upper layer and concentrated flocs at a lower layer, collecting the concentrated brine at the upper layer and reusing it in the hydrolysis reaction, and meanwhile collecting the concentrated flocs at the lower layer;
    4) dehydrating the concentrated flocs to separate the concentrated brine from metal hydroxide, collecting the metal hydroxide as a wet solid slag, and reusing the concentrated brine obtained by dehydrating into the hydrolysis reaction; and
    5) drying the wet solid slag to obtain a dry solid slag.

2. The method according to claim 1, wherein in step 1), a content of sodium chloride in the concentrated brine is 15-22 wt %, and a feed volume ratio of the spent chloroaluminate ionic liquid catalyst to the concentrated brine is 1: (50-60).

3. The method according to claim 1, wherein in step 1), the hydrolysis reaction is carried out in a plug flow packed bed reactor, and the plug flow packed bed reactor is filled with structured packing.

4. The method according to claim 3, wherein the structured packing has a porosity of 0.95-0.97 $m^3/m^3$, and a specific surface area of 300-500 $m^2/m^3$.

5. The method according to claim 3, wherein the plug flow packed bed reactor has an airspeed of 0.25-0.5 $h^{-1}$.

6. The method according to claim 3, wherein the structured packing is a Y-shaped corrugated orifice structured packing; a material of the structured packing is polyethylene, polyvinyl chloride or polyvinylidene fluoride.

7. The method according to claim 1, wherein in the step of the spent chloroaluminate ionic liquid catalyst being mixed with the concentrated brine to carry out hydrolysis reaction, when a pH of the acidic hydrolysate is basically stabilized at 2.5-2.8, the hydrolysis reaction is completed.

8. The method according to claim 1, wherein in step 2), the neutralization reaction is carried out in a complete-mixing flow reactor, and the complete-mixing flow reactor has an airspeed of 1-2 $h^{-1}$.

9. The method according to claim 1, wherein in step 2), a pH value of the neutralization solution is 8.0-8.5.

10. The method according to claim 1, wherein in step 3), the flocculant is an anionic polyacrylamide, the anionic polyacrylamide has a relative molecular weight of 6-18 million, and a charge density of 10-40%.

11. The method according to claim 10, wherein the flocculant is added in an amount of 20-30 g per ton of the neutralization solution, and time of the sedimentation and separation is 2-3 hours.

12. The method according to claim 1, wherein the spent chloroaluminate ionic liquid catalyst is a spent catalyst produced by using a chloroaluminate ionic liquid to catalyze C4 to produce an alkylated oil; the alkaline wastewater is an alkali washing wastewater produced by using a chloroaluminate ionic liquid to catalyze C4 to produce an alkylated oil.

13. A system for implementing the method according to claim 1, comprising:
a hydrolysis reactor, a neutralization reactor, a flocculation sedimentation system, a mechanical dehydration device and a drying device;
the hydrolysis reactor is configured to mix the spent chloroaluminate ionic liquid catalyst with the concentrated brine for hydrolysis reaction;
the neutralization reactor is connected to the hydrolysis reactor, and is configured to mix the acidic hydrolysate generated by the hydrolysis reaction with the alkaline solution containing the alkaline wastewater for neutralization reaction;
the flocculation sedimentation system is connected to the neutralization reactor, and is configured to fully mix the neutralization solution generated by the neutralization reaction with the flocculant and implement sedimentation and separation;
the mechanical dehydration device is connected to the flocculation sedimentation system, and is configured to perform a dehydration treatment on the concentrated flocs formed by the sedimentation and separation; and
the drying device is connected to the mechanical dehydration device, and is configured to dry the wet solid slag formed by the dehydration treatment.

14. The system according to claim 13, wherein the hydrolysis reactor comprises a shell; an annular oil collecting groove, a water distributor for distributing the concentrated brine and a material distributor for distributing the spent chloroaluminate ionic liquid catalysts are sequentially arranged on an upper part of the shell from top to bottom; a packing support bracket for supporting a packing is provided at a lower part of the shell; an exhaust port is provided at the top of the shell; an oil outlet, a water inlet and a feed inlet are provided on a side wall of the shell, the oil outlet is in communication with the annular oil collecting groove, the water inlet is in communication with the water distributor, the feed inlet is in communication with the material distributor; and a liquid outlet is provided at a bottom of the shell.

15. The system according to claim 13, wherein the neutralization reactor is a complete-mixing flow reactor; the neutralization reactor comprises a shell; a water distributor for distributing the alkaline solution and a material distributor for distributing the acidic hydrolysate are sequentially arranged at an upper part of the shell from top to bottom; a side-entry agitator is provided in the middle of the shell; an exhaust port is provided at the top of the shell; an alkali inlet and a liquid inlet are provided on a side wall of the shell, the alkali inlet is in communication with the water distributor, the liquid inlet is in communication with the material distributor; and a liquid outlet is provided at the bottom of the shell.

16. The system according to claim 14, wherein the water distributor comprises a water distribution main pipe, and a plurality of parallel water distribution branch pipes arranged at equal intervals are respectively provided on both sides of the water distribution main pipe, a plurality of water distribution holes are distributed at the bottom of each water distribution branch pipe, and a total opening area of the water distribution holes accounts for more than 1% of a cross-sectional area of the reactor.

17. The system according to claim 14, wherein the material distributor comprises a material distribution main pipe, a plurality of semicircular material distribution branch pipes arranged concentrically and at equal intervals are respectively provided on both sides of the material distribution main pipe, a plurality of material distribution holes are distributed at the bottom of each semicircular material distribution branch pipe, and a total opening area of the material distribution holes accounts for more than 2% of a cross-sectional area of the reactor.

18. The system according to claim 13, wherein the flocculation sedimentation system comprises a pipeline mixer and a flocculation sedimentation device arranged in sequence, the flocculation sedimentation device comprises a sealed shell; an annular overflow weir, a central pipe and a material distribution pipe are provided inside the sealed shell, the material distribution pipe is provided inside the central pipe, an umbrella-shaped baffle is provided at the bottom of the central pipe; an exhaust port is provided at the top of the sealed shell; a water outlet and a feed inlet are provided on a side wall of the sealed shell, the water outlet is in communication with the annular overflow weir, the feed inlet is in communication with the material distribution pipe; and a slag outlet is provided at the bottom of the sealed shell.

19. The system according to claim 14, further comprising:
a concentrated brine storage tank, a water seal port is provided at the top of the concentrated brine storage tank, and the exhaust port is connected to the water seal port of the concentrated brine storage tank through a pipeline.

20. The system according to claim 13, wherein the drying device is a thin-layer dryer or a low-temperature dehumidification dryer.

* * * * *